United States Patent
Dussan et al.

(10) Patent No.: US 11,175,386 B2
(45) Date of Patent: *Nov. 16, 2021

(54) LADAR SYSTEM WITH ADAPTIVE RECEIVER

(71) Applicant: AEYE, Inc., Belleville, IL (US)

(72) Inventors: Luis Carlos Dussan, Pleasanton, CA (US); Allan Steinhardt, Brentwood, CA (US); David Cook, San Ramon, CA (US)

(73) Assignee: AEYE, INC., Belleville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/024,014

(22) Filed: Sep. 17, 2020

(65) Prior Publication Data

US 2021/0003679 A1 Jan. 7, 2021

Related U.S. Application Data

(63) Continuation of application No. 15/430,235, filed on Feb. 10, 2017, now Pat. No. 10,782,393.
(Continued)

(51) Int. Cl.
*G01C 3/08* (2006.01)
*G01S 7/4863* (2020.01)
(Continued)

(52) U.S. Cl.
CPC ............ *G01S 7/4863* (2013.01); *G01S 7/487* (2013.01); *G01S 7/4813* (2013.01);
(Continued)

(58) Field of Classification Search
CPC ...... G01S 7/4863; G01S 7/4814; G01S 7/487; G01S 17/42; G01S 7/4813; G01S 7/4817; G01S 7/4818; G01S 7/497; G01S 17/10; G01S 17/89; G01S 7/4815; G01S 7/4816; G01S 17/08; G01S 7/4865; G01S 17/26; G01S 17/931; G01S 7/4876; G01S 17/66
See application file for complete search history.

(56) References Cited

U.S. PATENT DOCUMENTS

| | | |
|---|---|---|
| 4,017,146 A | 4/1977 | Lichtman |
| 4,579,430 A | 4/1986 | Bille |

(Continued)

FOREIGN PATENT DOCUMENTS

| | | |
|---|---|---|
| CN | 1424591 A | 6/2003 |
| CN | 101589316 A | 11/2009 |

(Continued)

OTHER PUBLICATIONS

"Coordination (linguistics)," Wikipedia, 2020, 10 pages, downloaded Oct. 15, 2020 from <https://en.wikipedia.org/wiki/Coordination_(linguistics)>.

(Continued)

*Primary Examiner* — Samantha K Nickerson
(74) *Attorney, Agent, or Firm* — Thompson Coburn LLP

(57) ABSTRACT

Disclosed herein are various embodiments for a ladar system that includes an adaptive ladar receiver whereby the active pixels in a photodetector array used for reception of ladar pulse returns can be adaptively controlled based at least in part on where the ladar pulses were targeted by the ladar transmitter.

30 Claims, 19 Drawing Sheets

Related U.S. Application Data

(60) Provisional application No. 62/297,112, filed on Feb. 18, 2016.

(51) Int. Cl.

| | | |
|---|---|---|
| *G01S 7/481* | (2006.01) | |
| *G01S 7/487* | (2006.01) | |
| *G01S 17/42* | (2006.01) | |
| *G01S 7/497* | (2006.01) | |
| *G01S 17/10* | (2020.01) | |
| *G01S 17/89* | (2020.01) | |
| *G01S 17/08* | (2006.01) | |
| *G01S 7/4865* | (2020.01) | |
| *G01S 17/66* | (2006.01) | |
| *G01S 17/26* | (2020.01) | |
| *G01S 17/931* | (2020.01) | |

(52) U.S. Cl.
CPC .......... *G01S 7/4814* (2013.01); *G01S 7/4815* (2013.01); *G01S 7/4816* (2013.01); *G01S 7/4817* (2013.01); *G01S 7/4818* (2013.01); *G01S 7/4865* (2013.01); *G01S 7/497* (2013.01); *G01S 17/08* (2013.01); *G01S 17/10* (2013.01); *G01S 17/42* (2013.01); *G01S 17/89* (2013.01); *G01S 7/4876* (2013.01); *G01S 17/26* (2020.01); *G01S 17/66* (2013.01); *G01S 17/931* (2020.01)

(56) References Cited

U.S. PATENT DOCUMENTS

| | | | |
|---|---|---|---|
| 4,888,785 A | 12/1989 | Lee | |
| 5,408,351 A | 4/1995 | Huang | |
| 5,552,893 A | 9/1996 | Akasu | |
| 5,596,600 A * | 1/1997 | Dimos | G01S 19/21 370/208 |
| 5,625,644 A | 4/1997 | Myers | |
| 5,638,164 A | 6/1997 | Landau | |
| 5,808,775 A | 9/1998 | Inagaki et al. | |
| 5,815,250 A | 9/1998 | Thomson et al. | |
| 5,831,719 A | 11/1998 | Berg et al. | |
| 5,870,181 A | 2/1999 | Andressen | |
| 6,031,601 A | 2/2000 | McCusker et al. | |
| 6,205,275 B1 | 3/2001 | Melville | |
| 6,245,590 B1 | 6/2001 | Wine et al. | |
| 6,288,816 B1 | 9/2001 | Melville et al. | |
| 6,330,523 B1 | 12/2001 | Kacyra et al. | |
| 6,704,619 B1 | 3/2004 | Coleman et al. | |
| 6,836,320 B2 | 12/2004 | Deflumere et al. | |
| 6,847,462 B1 | 1/2005 | Kacyra et al. | |
| 6,926,227 B1 | 8/2005 | Young et al. | |
| 7,038,608 B1 | 5/2006 | Gilbert | |
| 7,206,063 B2 | 4/2007 | Anderson et al. | |
| 7,236,235 B2 | 6/2007 | Dimsdale | |
| 7,397,019 B1 | 7/2008 | Byars et al. | |
| 7,436,494 B1 | 10/2008 | Kennedy et al. | |
| 7,532,311 B2 | 5/2009 | Henderson et al. | |
| 7,701,558 B2 | 4/2010 | Walsh et al. | |
| 7,800,736 B2 | 9/2010 | Pack et al. | |
| 7,878,657 B2 | 2/2011 | Hajjar | |
| 7,894,044 B1 | 2/2011 | Sullivan | |
| 7,944,548 B2 | 5/2011 | Eaton | |
| 8,072,663 B2 | 12/2011 | O'Neill et al. | |
| 8,081,301 B2 | 12/2011 | Stann et al. | |
| 8,120,754 B2 | 2/2012 | Kaehler | |
| 8,228,579 B2 | 7/2012 | Sourani | |
| 8,427,657 B2 | 4/2013 | Milanovi | |
| 8,635,091 B2 | 1/2014 | Amigo et al. | |
| 8,681,319 B2 | 3/2014 | Tanaka et al. | |
| 8,896,818 B2 | 11/2014 | Walsh et al. | |
| 9,069,061 B1 | 6/2015 | Harwit | |
| 9,085,354 B1 | 7/2015 | Peeters et al. | |
| 9,128,190 B1 | 9/2015 | Ulrich et al. | |
| 9,261,881 B1 | 2/2016 | Ferguson et al. | |
| 9,278,689 B1 | 3/2016 | Delp | |
| 9,285,477 B1 | 3/2016 | Smith et al. | |
| 9,305,219 B2 | 4/2016 | Ramalingam et al. | |
| 9,315,178 B1 | 4/2016 | Ferguson et al. | |
| 9,336,455 B1 | 5/2016 | Withers et al. | |
| 9,360,554 B2 | 6/2016 | Retterath et al. | |
| 9,383,753 B1 | 7/2016 | Templeton et al. | |
| 9,437,053 B2 | 9/2016 | Jenkins et al. | |
| 9,516,244 B2 | 12/2016 | Borowski | |
| 9,575,184 B2 | 2/2017 | Gilliland et al. | |
| 9,581,967 B1 | 2/2017 | Krause | |
| 9,651,417 B2 | 5/2017 | Shpunt et al. | |
| 9,679,367 B1 | 6/2017 | Wald et al. | |
| 9,841,495 B2 | 12/2017 | Campbell et al. | |
| 9,885,778 B2 | 2/2018 | Dussan | |
| 9,897,687 B1 | 2/2018 | Campbell et al. | |
| 9,897,689 B2 | 2/2018 | Dussan | |
| 9,933,513 B2 | 4/2018 | Dussan et al. | |
| 9,958,545 B2 | 5/2018 | Eichenholz et al. | |
| 10,007,001 B1 | 6/2018 | LaChapelle et al. | |
| 10,042,043 B2 | 8/2018 | Dussan | |
| 10,042,159 B2 | 8/2018 | Dussan et al. | |
| 10,073,166 B2 | 9/2018 | Dussan | |
| 10,078,133 B2 | 9/2018 | Dussan | |
| 10,088,558 B2 | 10/2018 | Dussan | |
| 10,134,280 B1 | 11/2018 | You | |
| 10,185,028 B2 | 1/2019 | Dussan et al. | |
| 10,209,349 B2 | 2/2019 | Dussan et al. | |
| 10,215,848 B2 | 2/2019 | Dussan | |
| 10,282,591 B2 | 5/2019 | Lindner et al. | |
| 10,379,205 B2 | 8/2019 | Dussan et al. | |
| 10,386,464 B2 | 8/2019 | Dussan | |
| 10,386,467 B2 | 8/2019 | Dussan et al. | |
| 10,495,757 B2 | 12/2019 | Dussan et al. | |
| 10,641,872 B2 | 5/2020 | Dussen et al. | |
| 10,641,873 B2 | 5/2020 | Dussan et al. | |
| 10,754,015 B2 | 8/2020 | Dussan et al. | |
| 10,761,196 B2 | 9/2020 | Dussen et al. | |
| 10,782,393 B2 | 9/2020 | Dussen et al. | |
| 10,797,460 B2 | 10/2020 | Shand | |
| 10,908,262 B2 | 2/2021 | Dussan | |
| 10,908,265 B2 | 2/2021 | Dussan | |
| 11,002,857 B2 | 5/2021 | Dussan et al. | |
| 2002/0039391 A1 * | 4/2002 | Wang | H04W 56/00 375/316 |
| 2002/0176067 A1 | 11/2002 | Charbon | |
| 2003/0122687 A1 | 7/2003 | Trajkovic et al. | |
| 2003/0151542 A1 | 8/2003 | Steinlechner et al. | |
| 2003/0156658 A1 * | 8/2003 | Dartois | H03F 1/3294 375/297 |
| 2004/0156336 A1 | 8/2004 | McFarland et al. | |
| 2005/0024595 A1 | 2/2005 | Suzuki | |
| 2005/0057654 A1 | 3/2005 | Byren | |
| 2005/0216237 A1 | 9/2005 | Adachi et al. | |
| 2006/0007362 A1 | 1/2006 | Lee et al. | |
| 2006/0176468 A1 | 8/2006 | Anderson et al. | |
| 2006/0197936 A1 | 9/2006 | Liebman et al. | |
| 2006/0227315 A1 | 10/2006 | Beller | |
| 2006/0265147 A1 | 11/2006 | Yamaguchi et al. | |
| 2008/0136626 A1 | 6/2008 | Hudson et al. | |
| 2008/0159591 A1 | 7/2008 | Ruedin | |
| 2008/0231494 A1 * | 9/2008 | Galati | G01S 13/878 342/37 |
| 2009/0059201 A1 | 3/2009 | Willner et al. | |
| 2009/0128864 A1 | 5/2009 | Inage | |
| 2009/0242468 A1 | 10/2009 | Corben et al. | |
| 2009/0292468 A1 | 11/2009 | Wu et al. | |
| 2009/0318815 A1 | 12/2009 | Barnes et al. | |
| 2010/0027602 A1 | 2/2010 | Abshire et al. | |
| 2010/0053715 A1 | 3/2010 | O'Neill et al. | |
| 2010/0165322 A1 | 7/2010 | Kane et al. | |
| 2010/0204964 A1 | 8/2010 | Pack et al. | |
| 2011/0066262 A1 | 3/2011 | Kelly et al. | |
| 2011/0085155 A1 | 4/2011 | Stann et al. | |
| 2011/0149268 A1 | 6/2011 | Marchant et al. | |
| 2011/0149360 A1 | 6/2011 | Sourani | |
| 2011/0153367 A1 | 6/2011 | Amigo et al. | |
| 2011/0260036 A1 | 10/2011 | Baraniuk et al. | |

(56) References Cited

U.S. PATENT DOCUMENTS

| | | |
|---|---|---|
| 2011/0282622 A1 | 11/2011 | Canter |
| 2011/0317147 A1 | 12/2011 | Campbell et al. |
| 2012/0038817 A1 | 2/2012 | McMackin et al. |
| 2012/0038903 A1 | 2/2012 | Weimer et al. |
| 2012/0044093 A1 | 2/2012 | Pala |
| 2012/0044476 A1 | 2/2012 | Earhart et al. |
| 2012/0236379 A1 | 9/2012 | da Silva et al. |
| 2012/0249996 A1 | 10/2012 | Tanaka et al. |
| 2012/0257186 A1 | 10/2012 | Rieger et al. |
| 2014/0021354 A1 | 1/2014 | Gagnon et al. |
| 2014/0078514 A1 | 3/2014 | Zhu |
| 2014/0201126 A1* | 7/2014 | Zadeh .................. A61B 5/165 706/52 |
| 2014/0211194 A1 | 7/2014 | Pacala et al. |
| 2014/0291491 A1 | 10/2014 | Shpunt et al. |
| 2014/0300732 A1 | 10/2014 | Friend et al. |
| 2014/0350836 A1 | 11/2014 | Stettner et al. |
| 2015/0006616 A1 | 1/2015 | Walley et al. |
| 2015/0046078 A1 | 2/2015 | Biess |
| 2015/0081211 A1 | 3/2015 | Zeng et al. |
| 2015/0269439 A1 | 9/2015 | Versace et al. |
| 2015/0285625 A1 | 10/2015 | Deane |
| 2015/0304634 A1 | 10/2015 | Karvounis |
| 2015/0331113 A1 | 11/2015 | Stettner et al. |
| 2015/0334371 A1 | 11/2015 | Galera et al. |
| 2015/0369920 A1 | 12/2015 | Setono et al. |
| 2015/0378011 A1 | 12/2015 | Owechko |
| 2015/0378187 A1 | 12/2015 | Heck et al. |
| 2016/0003946 A1 | 1/2016 | Gilliland et al. |
| 2016/0005229 A1 | 1/2016 | Lee et al. |
| 2016/0041266 A1 | 2/2016 | Smits |
| 2016/0047895 A1 | 2/2016 | Dussan |
| 2016/0047896 A1 | 2/2016 | Dussan |
| 2016/0047897 A1 | 2/2016 | Dussan |
| 2016/0047898 A1 | 2/2016 | Dussan |
| 2016/0047899 A1 | 2/2016 | Dussan |
| 2016/0047900 A1 | 2/2016 | Dussan |
| 2016/0047903 A1 | 2/2016 | Dussan |
| 2016/0054735 A1 | 2/2016 | Switkes et al. |
| 2016/0146595 A1 | 5/2016 | Boufounos et al. |
| 2016/0274589 A1 | 9/2016 | Templeton et al. |
| 2016/0293647 A1 | 10/2016 | Lin et al. |
| 2016/0379094 A1 | 12/2016 | Mittal et al. |
| 2017/0003392 A1 | 1/2017 | Bartlett et al. |
| 2017/0043771 A1 | 2/2017 | Ibanez-Guzman et al. |
| 2017/0158239 A1 | 6/2017 | Dhome et al. |
| 2017/0199280 A1 | 7/2017 | Nazemi et al. |
| 2017/0205873 A1 | 7/2017 | Shpunt et al. |
| 2017/0211932 A1 | 7/2017 | Zadravec et al. |
| 2017/0219695 A1 | 8/2017 | Hall et al. |
| 2017/0234973 A1 | 8/2017 | Axelsson |
| 2017/0242102 A1 | 8/2017 | Dussan et al. |
| 2017/0242103 A1 | 8/2017 | Dussan |
| 2017/0242104 A1 | 8/2017 | Dussan |
| 2017/0242105 A1 | 8/2017 | Dussan et al. |
| 2017/0242106 A1 | 8/2017 | Dussan et al. |
| 2017/0242107 A1 | 8/2017 | Dussan et al. |
| 2017/0242108 A1 | 8/2017 | Dussan et al. |
| 2017/0242109 A1 | 8/2017 | Dussan et al. |
| 2017/0263048 A1 | 9/2017 | Glaser et al. |
| 2017/0269197 A1 | 9/2017 | Hall et al. |
| 2017/0269198 A1 | 9/2017 | Hall et al. |
| 2017/0269209 A1 | 9/2017 | Hall et al. |
| 2017/0269215 A1 | 9/2017 | Hall et al. |
| 2017/0307876 A1 | 10/2017 | Dussan et al. |
| 2018/0031703 A1 | 2/2018 | Ngai et al. |
| 2018/0075309 A1 | 3/2018 | Sathyanarayana et al. |
| 2018/0120436 A1 | 5/2018 | Smits |
| 2018/0143300 A1 | 5/2018 | Dussan |
| 2018/0143324 A1 | 5/2018 | Keilaf et al. |
| 2018/0188355 A1 | 7/2018 | Bao et al. |
| 2018/0224533 A1 | 8/2018 | Dussan et al. |
| 2018/0238998 A1 | 8/2018 | Dussan et al. |
| 2018/0239000 A1 | 8/2018 | Dussan et al. |
| 2018/0239001 A1 | 8/2018 | Dussan et al. |
| 2018/0239004 A1 | 8/2018 | Dussan et al. |
| 2018/0239005 A1 | 8/2018 | Dussan et al. |
| 2018/0284234 A1 | 10/2018 | Curatu |
| 2018/0306927 A1 | 10/2018 | Slutsky et al. |
| 2018/0341103 A1 | 11/2018 | Dussan et al. |
| 2018/0372870 A1 | 12/2018 | Puglia |
| 2019/0025407 A1 | 1/2019 | Dussan |
| 2019/0086514 A1 | 3/2019 | Dussan et al. |
| 2019/0086550 A1 | 3/2019 | Dussan et al. |
| 2019/0271767 A1 | 9/2019 | Keilaf et al. |
| 2020/0025886 A1 | 1/2020 | Dussan et al. |
| 2020/0025887 A1 | 1/2020 | Dussan et al. |
| 2021/0141059 A1 | 5/2021 | Dussan |

FOREIGN PATENT DOCUMENTS

| | | |
|---|---|---|
| CN | 102023082 A | 4/2011 |
| CN | 102667571 A | 9/2012 |
| CN | 103033806 A | 4/2013 |
| CN | 103324945 A | 9/2013 |
| CN | 103885065 A | 6/2014 |
| EP | 1901093 A1 | 3/2008 |
| EP | 2957926 A1 | 12/2015 |
| JP | H0798381 A | 4/1995 |
| JP | H11-153664 A | 6/1999 |
| JP | 2000056018 A | 2/2000 |
| JP | 2000509150 A | 7/2000 |
| JP | 2003256820 A | 9/2003 |
| JP | 2004157044 A | 6/2004 |
| JP | 2005331273 A | 12/2005 |
| JP | 2006-329971 A | 12/2006 |
| JP | 2012202776 A | 10/2012 |
| JP | 2012252068 A | 12/2012 |
| JP | 2013015338 A | 1/2013 |
| JP | 2013156139 A | 8/2013 |
| JP | 2014059301 A | 4/2014 |
| JP | 2014059302 A | 4/2014 |
| JP | 2014077658 A | 5/2014 |
| WO | 2004034084 A1 | 4/2004 |
| WO | 2006/076474 A1 | 7/2006 |
| WO | 2008008970 A2 | 1/2008 |
| WO | 2012027410 A1 | 3/2012 |
| WO | 2016025908 A2 | 2/2016 |
| WO | 2017/143183 A1 | 8/2017 |
| WO | 2017/143217 A1 | 8/2017 |
| WO | 2018/152201 A1 | 8/2018 |

OTHER PUBLICATIONS

Hui et al., "Analysis of Scanning Characteristics of a Two-Dimensional Scanning Lidar", Infrared (Monthly), Jun. 2010, pp. 10-14, vol. 31 No. 6 (http://journal.sitp.ac.cn/hw).

International Preliminary Report on Patentability or PCT/US2017/018415 dated Aug. 30, 2018.

Johnson et al., "Development of a Dual-Mirror-Scan Elevation-Monopulse Antenna System", Proceedings of the 8th European Radar Conference, 2011, pp. 281-284, Manchester, UK.

Notice of Acceptance of AU Application 2017221438 dated May 26, 2021.

English Translation of Japanese Office Action for Japanese Patent Application 2018-543723, dated Nov. 2020, pp. 1-9.

Examination Report for Australian Patent Application 2017221438, dated Dec. 2020, pp. 1-8.

Prosecution History for U.S. Pat. No. 10,761,196 downloaded from USPTO Patent Center.

Prosecution History for U.S. Pat. No. 10,754,015 downloaded from USPTO Patent Center.

Prosecution History for U.S. Pat. No. 10,641,872 downloaded from USPTO Patent Center.

Prosecution History for U.S. Pat. No. 10,782,393 downloaded from USPTO Patent Center.

Prosecution History for U.S. Pat. No. 10,641,873 downloaded from USPTO Patent Center.

"Amendment and Response A" for U.S. Appl. No. 15/430179 dated Sep. 27, 2019.

(56) References Cited

OTHER PUBLICATIONS

"Amendment and Response A" for U.S. Appl. No. 15/430,192 dated Sep. 27, 2019.
"Amendment and Response A" for U.S. Appl. No. 15/430,200 dated Sep. 27, 2019.
"Compressed Sensing," Wikipedia, 2019, downloaded Jun. 22, 2019 from https://en.wikipedia.org/wiki/Compressed_sensing, 16 pgs.
"Entrance Pupil," Wikipedia, 2016, downloaded Jun. 21, 2019 from https://enwikipedia.org/wiki/Entrance_pupil, 2 pgs.
Analog Devices, "Data Sheet AD9680", 98 pages, 2014-2015.
Donoho, "Compressed Sensing", IEEE Transactions on Inmformahon Theory, Apr. 2006, pp. 1289-1306, vol. 52, No. 4.
Extended European Search Report for EP 17753942.6 dated Sep. 11, 2019.
Extended European Search Report for EP Application 15832272.7 dated Mar. 14, 2018.
Howland et al., "Compressive Sensing LIDAR for 3D Imaging", Optical Society of America, May 1-6, 2011, 2 pages.
International Search Report and Written Opinion for PCT/US15/45399 dated Feb. 2, 2016.
International Search Report and Written Opinion for PCT/US2017/018415 dated Jul. 6, 2017.
International Search Report and Written Opinion for PCT/US2018/018179 dated Jun. 26, 2018.
Kessler, "An afocal beam relay for laser XY scanning systems", Proc. of SPIE vol. 8215, 9 pages, 2012.
Kim et al., "Investigation on the occurrence of mutual interference between pulsed terrestrial LIDAR scanners", 2015 IEEE Intelligent Vehicles Symposium (IV), Jun. 28-Jul. 1, 2015, COEX, Seoul, Korea, pp. 437-442.
Maxim Integrated Products, Inc., Tutorial 800, "Design a Low-Jitter Clock for High Speed Data Converters", 8 pages, Jul. 17, 2002.
Moss et al., "Low-cost compact MEMS scanning LADAR system for robotic applications", Proc. of SPIE, 2012, vol. 8379, 837903-1 to 837903-9.
Notice of Allowance for U.S. Appl. No. 15/896,241 dated Sep. 12, 2018.
Notice of Allowance for U.S. Appl. No. 15/896,254 dated Nov. 23, 2018.
Office Action for U.S. Appl. No. 15/430,179 dated Jan. 7, 2020.
Office Action for U.S. Appl. No. 15/430,179 dated Jun. 27, 2019.
Office Action for U.S. Appl. No. 15/430,192 dated Jan. 8, 2019.
Office Action for U.S. Appl. No. 15/430,192 dated Jun. 27, 2019.
Office Action for U.S. Appl. No. 15/430,200 dated Dec. 20, 2019.
Office Action for U.S. Appl. No. 15/430,200 dated Jun. 27, 2019.
Office Action for U.S. Appl. No. 15/430,221 dated Jan. 30, 2019.
Office Action for U.S. Appl. No. 15/431,096 dated Nov. 14, 2017.
Prosecution History for U.S. Appl. No. 15/590,491 filed May 9, 2017, now U.S. Pat. No. 9,933,513, granted Apr. 3, 2018.
Redmayne et al., "Understanding the Effect of Clock Jitter on High Speed ADCs", Design Note 1013, Linear Technology, 4 pages, 2006.
Rehn, "Optical properties of elliptical reflectors", Opt. Eng. 43(7), pp. 1480-1488, Jul. 2004.
Sharafutdinova et al., "Improved field scanner incorporating parabolic optics. Part 1: Simulation", Applied Optics, vol. 18, No. 22, p. 4389-4396, Aug. 2009.
Examination Report for European Application 17753942.6 dated Jul. 27, 2021.
Office Action for JP Application 2018-543723 dated Jul. 6, 2021 and English Translation.
Search Report for TW Application 106105417 dated Jun. 25, 2021.

* cited by examiner

LADAR SYSTEM WITH ADAPTIVE RECEIVER

CROSS-REFERENCE AND PRIORITY CLAIM TO RELATED PATENT APPLICATIONS

This patent application is a continuation of U.S. patent application Ser. No. 15/430,235, filed Feb. 10, 2017, and entitled "Ladar Receiver Range Measurement using Distinct Optical Path for Reference Light", now U.S. Pat. No. 10,782,393, which claims priority to U.S. provisional patent application 62/297,112, filed Feb. 18, 2016, and entitled "Ladar Receiver", the entire disclosures of each of which are incorporated herein by reference.

This patent application is also related to (1) U.S. patent application Ser. No. 15/430,179, filed Feb. 10, 2017, and entitled "Adaptive Ladar Receiving Method", now U.S. Pat. No. 10,761,196, (2) U.S. patent application Ser. No. 15/430,192, filed Feb. 10, 2017, and entitled "Adaptive Ladar Receiver", now U.S. Pat. No. 10,754,015, (3) U.S. patent application Ser. No. 15/430,200, filed Feb. 10, 2017, and entitled "Ladar Receiver with Advanced Optics", now U.S. Pat. No. 10,641,872, and (4) U.S. patent application Ser. No. 15/430,221, filed Feb. 10, 2017, and entitled "Ladar System with Dichroic Photodetector for Tracking the Targeting of a Scanning Ladar Transmitter", the entire disclosures of each of which are incorporated herein by reference.

INTRODUCTION

It is believed that there are great needs in the art for improved computer vision technology, particularly in an area such as automobile computer vision. However, these needs are not limited to the automobile computer vision market as the desire for improved computer vision technology is ubiquitous across a wide variety of fields, including but not limited to autonomous platform vision (e.g., autonomous vehicles for air, land (including underground), water (including underwater), and space, such as autonomous land-based vehicles, autonomous aerial vehicles, etc.), surveillance (e.g., border security, aerial drone monitoring, etc.), mapping (e.g., mapping of sub-surface tunnels, mapping via aerial drones, etc.), target recognition applications, remote sensing, safety alerting (e.g., for drivers), and the like).

As used herein, the term "ladar" refers to and encompasses any of laser radar, laser detection and ranging, and light detection and ranging ("lidar"). Ladar is a technology widely used in connection with computer vision. In an exemplary ladar system, a transmitter that includes a laser source transmits a laser output such as a ladar pulse into a nearby environment. Then, a ladar receiver will receive a reflection of this laser output from an object in the nearby environment, and the ladar receiver will process the received reflection to determine a distance to such an object (range information). Based on this range information, a clearer understanding of the environment's geometry can be obtained by a host processor wishing to compute things such as path planning in obstacle avoidance scenarios, way point determination, etc. However, conventional ladar solutions for computer vision problems suffer from high cost, large size, large weight, and large power requirements as well as large data bandwidth use. The best example of this being vehicle autonomy. These complicating factors have largely limited their effective use to costly applications that require only short ranges of vision, narrow fields-of-view and/or slow revisit rates.

In an effort to solve these problems, disclosed herein are a number of embodiments for an improved ladar receiver and/or improved ladar transmitter/receiver system. For example, the inventors disclose a number of embodiments for an adaptive ladar receiver and associated method where subsets of pixels in an addressable photodetector array are controllably selected based on the locations of range points targeted by ladar pulses. Further still, the inventors disclose example embodiments where such adaptive control of the photodetector array is augmented to reduce noise (including ladar interference), optimize dynamic range, and mitigate scattering effects, among other features. The inventors show how the receiver can be augmented with various optics in combination with a photodetector array. Through these disclosures, improvements in range precision can be achieved, including expected millimeter scale accuracy for some embodiments. These and other example embodiments are explained in greater detail below.

DETAILED DESCRIPTION OF EXAMPLE EMBODIMENTS

Figure 1A:
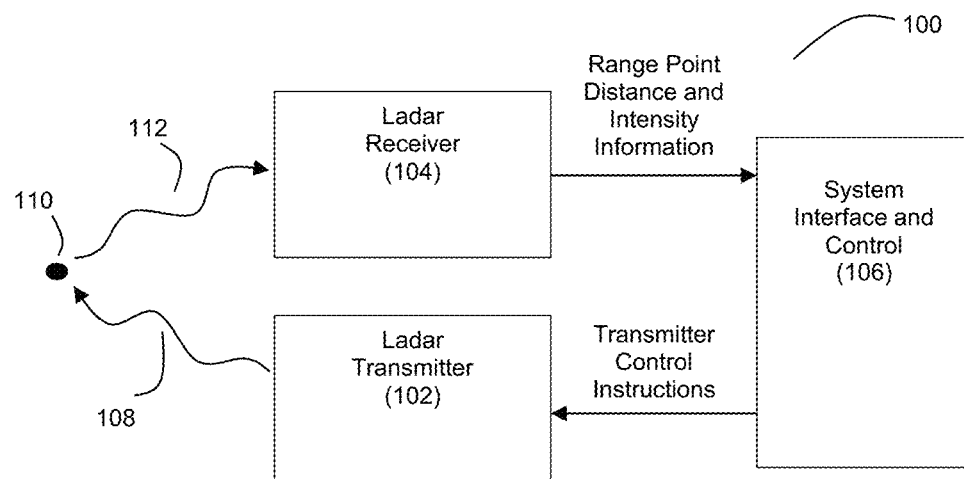
FIG. 1A illustrates an example embodiment of a ladar transmitter/receiver system.

FIG. 1A illustrates an example embodiment of a ladar transmitter/receiver system 100. The system 100 includes a ladar transmitter 102 and a ladar receiver 104, each in communication with system interface and control 106. The ladar transmitter 102 is configured to transmit a plurality of ladar pulses 108 toward a plurality of range points 110 (for ease of illustration, a single such range point 108 is shown in FIG. 1A). Ladar receiver 104 receives a reflection 112 of this ladar pulse from the range point 110. Ladar receiver 104 is configured to receive and process the reflected ladar pulse 112 to support a determination of range point distance and intensity information. Example embodiments for innovative ladar receivers 104 are described below.

Figure 1B:
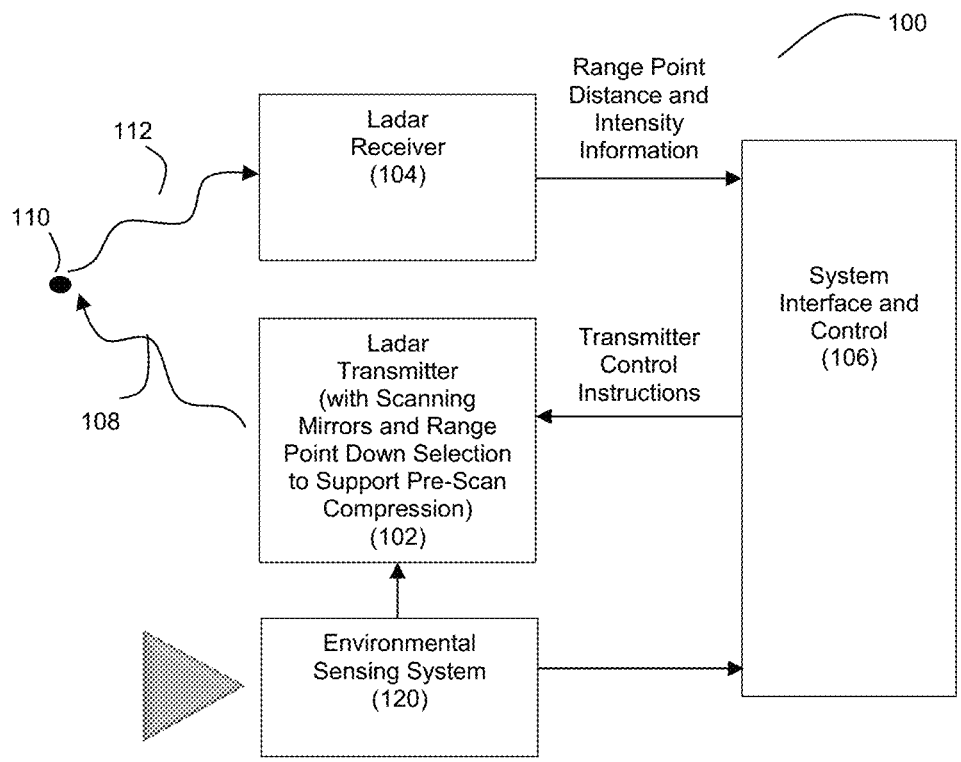
FIG. 1B illustrates another example embodiment of a ladar transmitter/receiver system where the ladar transmitter employs scanning mirrors and range point down selection to support pre-scan compression.

In an example embodiment, the ladar transmitter 102 can take the form of a ladar transmitter that includes scanning mirrors and uses a range point down selection algorithm to support pre-scan compression (which can be referred herein to as "compressive sensing"), as shown by FIG. 1B. Such an embodiment may also include an environmental sensing system 120 that provides environmental scene data to the ladar transmitter to support the range point down selection. Example embodiments of such ladar transmitter designs can be found in U.S. patent application Ser. No. 62/038,065, filed Aug. 15, 2014 and U.S. Pat. App. Pubs. 2016/0047895, 2016/0047896, 2016/0047897, 2016/0047898, 2016/0047899, 2016/0047903, and 2016/0047900, the entire disclosures of each of which are incorporated herein by reference. For example, incorporated U.S. Pat. App Pub. 2016/0047895 discloses a ladar transmitter that employs a dynamic scan pattern where the beam scanner will not scan through a full scan area, and instead the mirrors will target the range points on a shot list in accordance with a scan pattern that varies as a function of the ordered range points on the shot list. Because the shot list will be varying from frame to frame captured by the environmental sensing system 120, the scan pattern is dynamic as it will also vary from frame to frame. As a further example where the ladar transmitter has an X-axis mirror and a Y-axis mirror, the driving waveform that can be used to drive the mirror positions for the X-axis mirror can drive the X-axis mirror in a resonant mode, and the driving waveform that can be used to drive the Y-axis mirror can drive the Y-axis mirror in a point-to-point mode where the driving waveform varies as function of the shot list. Through the use of pre-scan compression, such a ladar transmitter can better manage bandwidth through intelligent range point target selection.

Figure 2:
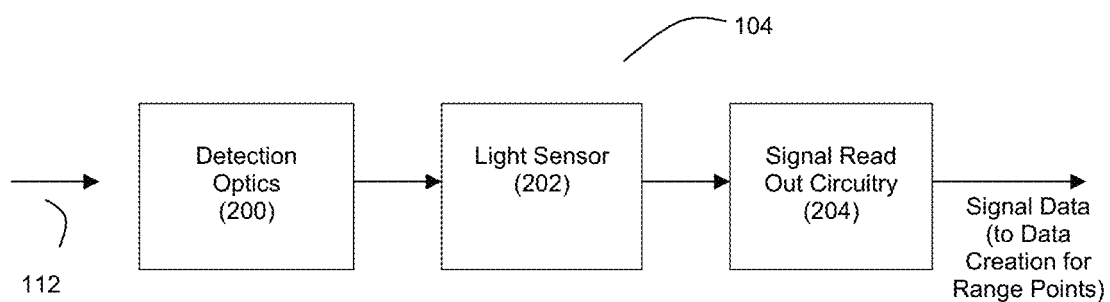
FIG. 2 illustrates an example block diagram for an example embodiment of a ladar receiver.

FIG. 2 illustrates an example block diagram for an example embodiment of a ladar receiver 104. The ladar receiver comprises detection optics 200 that receive light that includes the reflected ladar pulses 112. The detection optics 200 are in optical communication with a light sensor 202, and the light sensor 202 generates signals indicative of the sensed reflected ladar pulses 112. Signal read out circuitry 204 reads the signals generated by the sensor 202 to generate signal data that is used for data creation with respect to the range points (e.g., computing range point distance information, range point intensity information, etc.). It should be understood that the ladar receiver 104 may include additional components not shown by FIG. 2. FIGS. 3A-5B show various example embodiments of detection optics 200 that may be used with the ladar receiver 104. The light sensor 202 may comprise an array of multiple individually addressable light sensors (e.g., an n-element photodetector array). As an example embodiment, the light sensor 202 can take the form of a silicon PIN array (e.g., an InGaAs PIN array). As another example embodiment, the light sensor 202 can take the form of a silicon avalanche photodiode (APD) array (e.g., an InGaAs APD array). The readout circuitry 204 can take any of a number of forms (e.g., a read out integrated circuit (ROTC)), and example embodiments for the readout circuitry are described below.

Figure 3A:
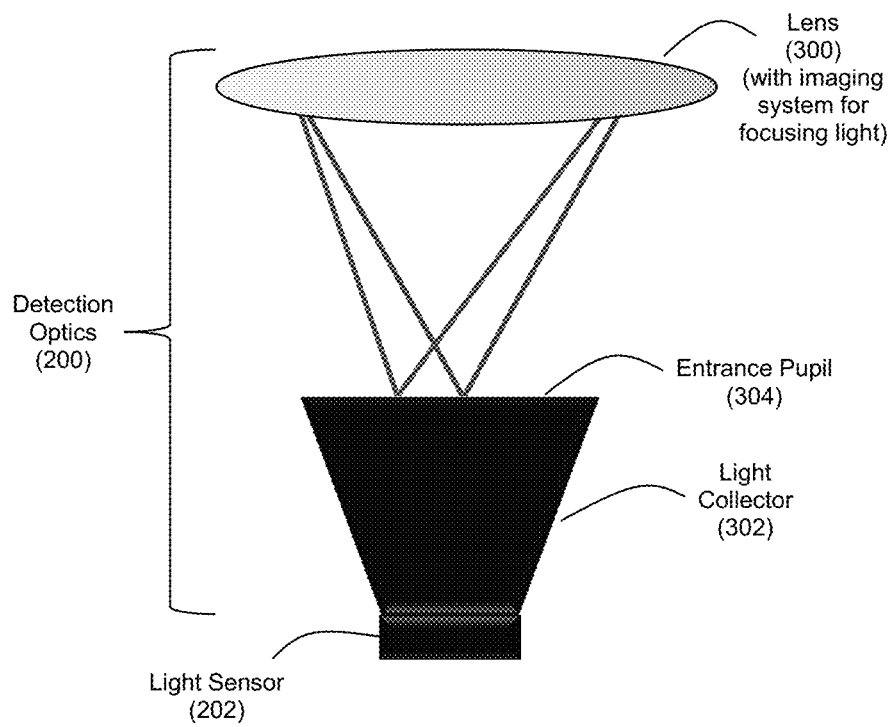
FIG. 3A illustrates an example embodiment of detection optics for a ladar receiver, where the imaging detection optics employ a non-imaging light collector.

FIG. 3A illustrates an example embodiment of detection optics 200 for a ladar receiver 104 which employs a non-imaging light collector 302. Thus, the non-imaging light collector 302 such as a compound parabolic concentrator, does not re-image the image plane at its entrance fixed pupil 304 onto the light sensor 202 with which it is bonded at its exit aperture. With such an example embodiment, a lens 300 that includes an imaging system for focusing light is in optical communication with the non-imaging light collector 302. In the example of FIG. 3A, the lens 300 is positioned and configured such that the lens focuses light (image plane) at the entrance pupil 304 of the light collector 302 even though there is no actual image at the bonded light sensor.

Figure 3B:
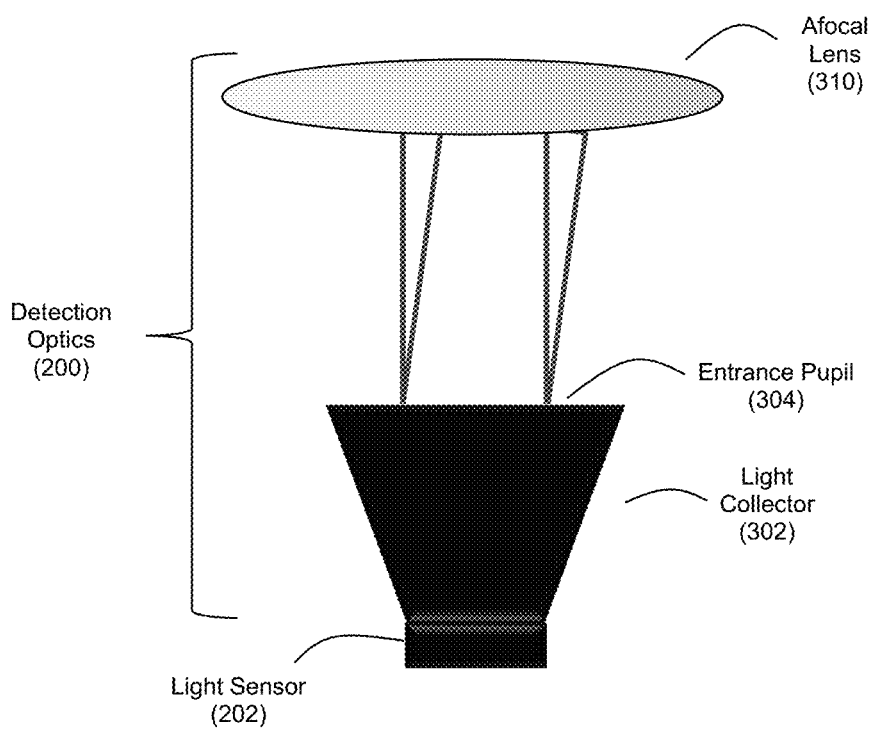
FIG. 3B illustrates another example embodiment of detection optics for a ladar receiver, where the afocal detection optics employ a non-imaging light collector.

FIG. 3B illustrates another example embodiment of detection optics 200 which employ a non-imaging light collector 302. With such an example embodiment, an afocal lens group 310 is in optical communication with the non-imaging light collector 302. The light collector 302 includes an entrance pupil 304, and it can be bonded with the light sensor 202 at its exit aperture. In the example of FIG. 3B, the lens 310 is positioned and configured such that the entrance pupil of the afocal lens group is re-imaged at the entrance pupil 304 of the light collector 302. The inventor also notes that if desired by a practitioner, the FIG. 3B embodiment may omit the afocal lens 310.

With the example embodiments of FIGS. 3A and 3B, the light collector 302 can take forms such as a fiber taper light collector or a compound parabolic concentrator. An example fiber taper light collector is available from Schott, and an example compound parabolic concentrator is available from Edmunds Optics.

The example embodiments of FIGS. 3A and 3B provide various benefits to practitioners. For example, these example embodiments permit the use of relatively small detector arrays for light sensor 202. As another example, these embodiments can be useful as they provide a practitioner with an opportunity to trade detector acceptance angle for detector size as well as trade SNR for high misalignment tolerance. However, the embodiments of FIGS. 3A and 3B do not produce optimal SNRs relative to other embodiments.

Figure 4:
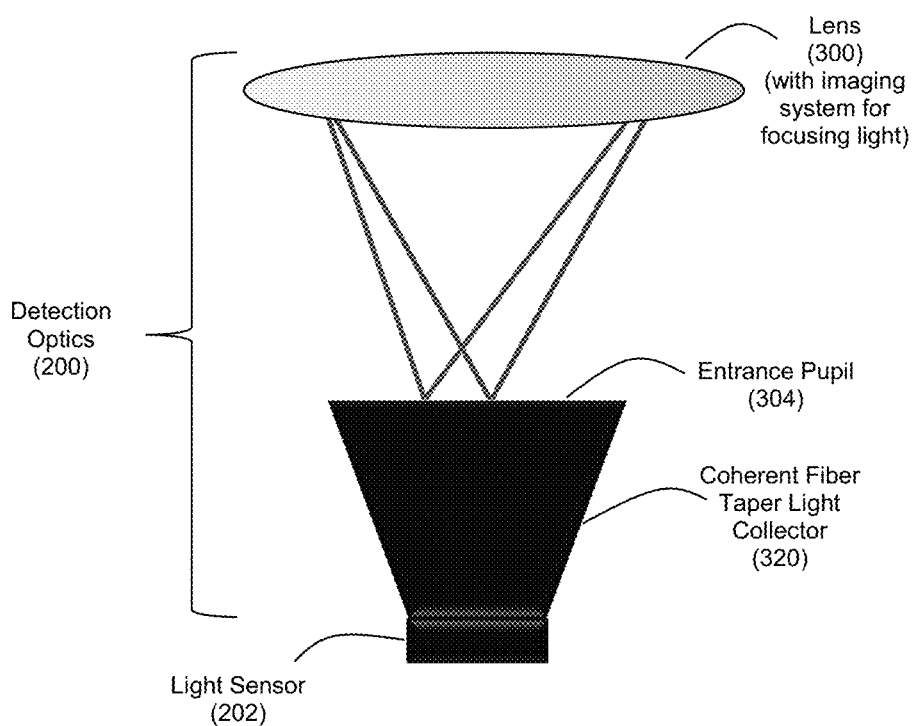
FIG. 4 illustrates an example embodiment of imaging detection optics for a ladar receiver, where the imaging detection optics employ an imaging light collector.

FIG. 4 illustrates an example embodiment of detection optics 200 which employ an imaging light collector 320. Thus, the imaging light collector 320 re-images the image received at its entrance pupil 304 onto the light sensor 202. With such an example embodiment, a lens 300 that includes an imaging system for focusing light is in optical communication with the imaging light collector 320. The lens is positioned and configured such that the lens focuses light (image plane) at the entrance pupil 304 of the light collector 302, and the light collector 320 images this light onto the bonded light sensor 202. In an example embodiment, the light collector 320 can take the form of a coherent fiber taper light collector. An example coherent fiber taper light collector is available from Schott.

The example embodiment of FIG. 4 also provides various benefits to practitioners. For example, as with the examples of FIGS. 3A and 3B, the example embodiment of FIG. 4 permits the use of relatively small detector arrays for light sensor 202. This embodiment can also be useful for providing a practitioner with an opportunity to trade detector acceptance angle for detector size as well as trade SNR for high misalignment tolerance. A benefit of the FIG. 4 example embodiment relative to the FIGS. 3A/3B example embodiments is that the FIG. 4 example embodiment generally produces higher SNR.

Figure 5A:
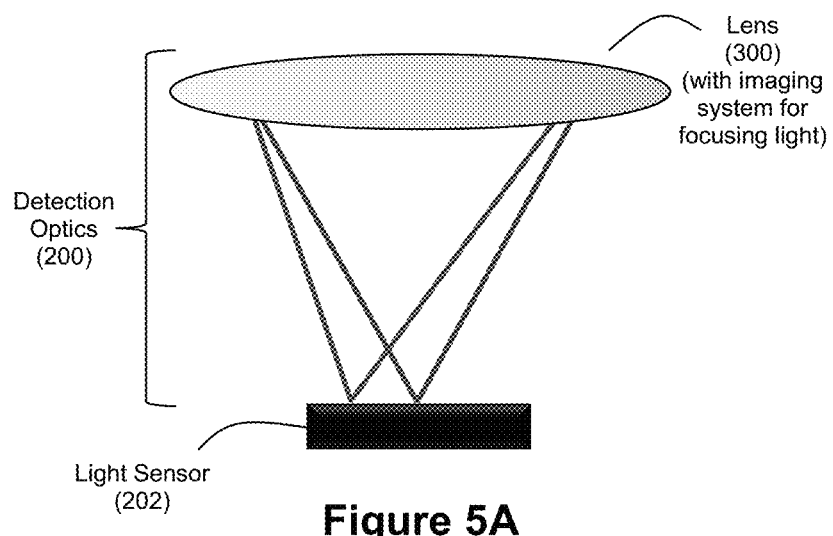
FIG. 5A illustrates an example embodiment of a direct-to-detector embodiment for an imaging ladar receiver.

FIG. 5A illustrates an example embodiment of "direct to detector" detection optics 200 for a ladar receiver 104. With such an example embodiment, a lens 300 that includes an imaging system for focusing light is in optical communication with the light sensor 202. The lens 300 is positioned and configured such that the lens focuses light (image plane) directly onto the light sensor 202. Thus, unlike the embodiment of FIGS. 3A and 4, there is no light collector between the lens 300 and the light sensor 202.

Figure 5B:
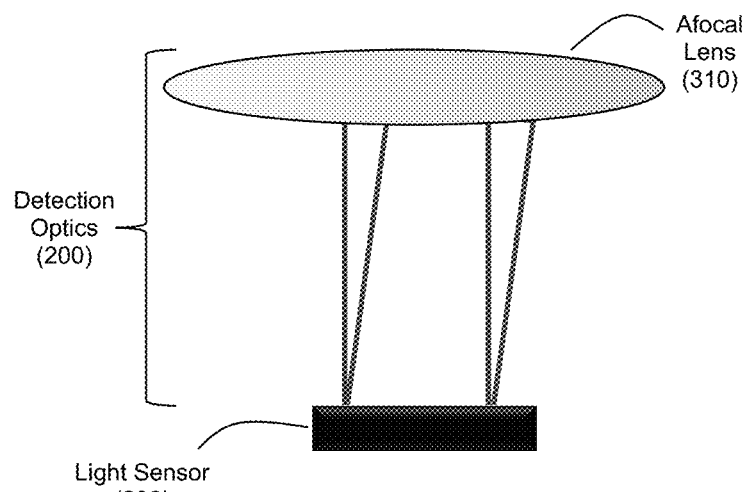
FIG. 5B illustrates another example embodiment of a direct-to-detector embodiment for a non imaging ladar receiver.

FIG. 5B illustrates another example embodiment of "direct to detector" detection optics 200 for a ladar receiver 104. With such an example embodiment, an afocal lens 310 is in optical communication with the light sensor 202. The lens 310 is positioned and configured such that the lens pupil is re-imaged directly onto the light sensor 202. The inventor also notes that if desired by a practitioner, the FIG. 5B embodiment may omit the afocal lens 310.

The example embodiments of FIGS. 5A and 5B are expected to require a larger detector array for the light sensor 202 (for a given system field of view (FOV) relative to other embodiments), but they are also expected to exhibit very good SNR. As between the embodiments of FIGS. 5A and 5B, the embodiment of FIG. 5A will generally exhibit better SNR than the embodiment of FIG. 5B, but it is expected that the embodiment of FIG. 5B will generally be more tolerant to misalignment (which means the FIG. 5B embodiment would be easier to manufacture).

It should also be understood that the detection optics 200 can be designed to provide partial imaging of the image plane with respect to the light sensor 202 if desired by a practitioner. While this would result in a somewhat "blurry" image, such blurriness may be suitable for a number of applications and/or conditions involving low fill factor detector arrays.

Figure 6A:
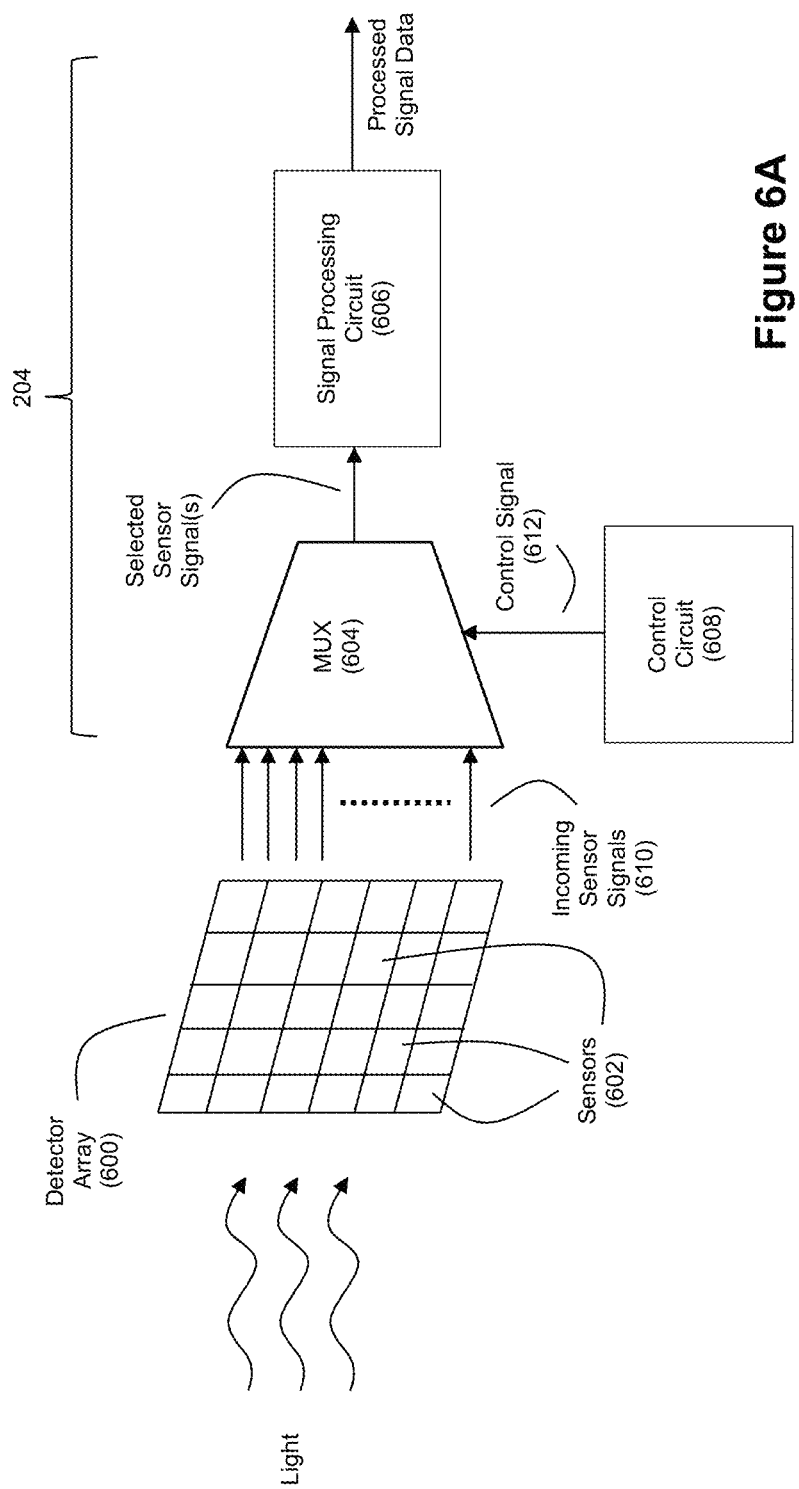
FIG. 6A illustrates an example embodiment for readout circuitry within a ladar receiver that employs a multiplexer for selecting which sensors within a detector array are passed to a signal processing circuit.

FIG. 6A illustrates an example embodiment for readout circuitry 204 within a ladar receiver that employs a multiplexer 604 for selecting which sensors 602 within a detector array 600 are passed to a signal processing circuit 606. In this example embodiment, the light sensor 202 takes the forms of a detector array 600 comprising a plurality of individually-addressable light sensors 602. Each light sensor 602 can be characterized as a pixel of the array 600, and each light sensor 602 will generate its own sensor signal 610 in response to incident light. Thus, the array 600 can comprise a photodetector with a detection region that comprises a plurality of photodetector pixels. The embodiment of FIG. 6A employs a multiplexer 604 that permits the readout circuitry 204 to isolate the incoming sensor signals 610 that are passed to the signal processing circuit 606 at a given time. In doing so, the embodiment of FIG. 6A provides better received SNR, especially against ambient passive light, relative to ladar receiver designs such as those disclosed by U.S. Pat. No. 8,081,301 where no capability is disclosed for selectively isolating sensor readout. Thus, the signal processing circuit 606 can operate on a single incoming sensor signal 610 (or some subset of incoming sensor signals 610) at a time.

The multiplexer 604 can be any multiplexer chip or circuit that provides a switching rate sufficiently high to meet the needs of detecting the reflected ladar pulses. In an example embodiment, the multiplexer 604 multiplexes photocurrent signals generated by the sensors 602 of the detector array 600. However, it should be understood that other embodiments may be employed where the multiplexer 604 multiplexes a resultant voltage signal generated by the sensors 602 of the detector array 600. Moreover, in example embodiments where a ladar receiver that includes the readout circuitry 204 of FIG. 6A is paired with a scanning ladar transmitter that employs pre-scan compressive sensing (such as the example embodiments employing range point down selection that are described in the above-referenced and incorporated patent applications), the selective targeting of range points provided by the ladar transmitter pairs well with the selective readout provided by the multiplexer 604 so that the receiver can isolate detector readout to pixels of interest in an effort to improve SNR.

Figure 8:
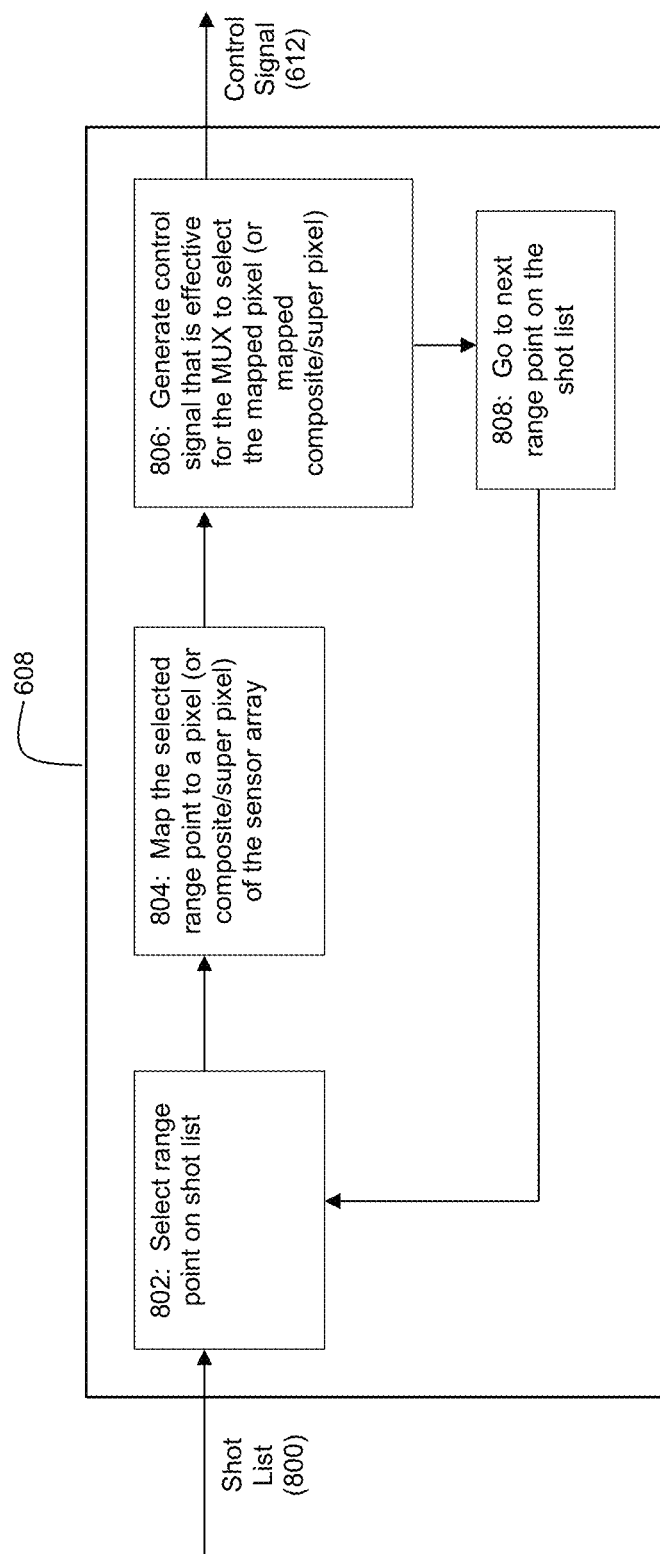
FIG. 8 depicts an example embodiment of a control circuit for generating the multiplexer control signal.

A control circuit 608 can be configured to generate a control signal 612 that governs which of the incoming sensor signals 610 are passed to signal processing circuit 606. In an example embodiment where a ladar receiver that includes the readout circuitry 204 of FIG. 6A is paired with a scanning ladar transmitter that employs pre-scan compressive sensing according to a scan pattern, the control signal 612 can cause the multiplexer to selectively connect to individual light sensors 602 in a pattern that follows the transmitter's shot list (examples of the shot list that may be employed by such a transmitter are described in the above-referenced and incorporated patent applications). The control signal 612 can select sensors 602 within array 600 in a pattern that follows the targeting of range points via the shot list. Thus, if the transmitter is targeting pixel x,y with a ladar pulse, the multiplexer 604 can generate a control signal 612 that causes a readout of pixel x,y from the detector array 600. FIG. 8 shows an example embodiment for control circuit 608. The control circuit 608 receives the shot list 800 as an input. This shot list is an ordering listing of the pixels within a frame that are to be targeted as range points by the ladar transmitter. At 802, the control circuit selects a first of the range points/target pixels on the shot list. At 804, the control circuit maps the selected range point to a sensor/pixel (or a composite pixel/superpixel) of the detector array 600. At 806, the control circuit then generates a control signal 612 that is effective to cause the multiplexer to readout the mapped sensor/pixel (or composite pixel/superpixel) of the detector array 600. At 808, the control circuit progresses to the next range point/target pixel on the shot list and returns to operation 802. If necessary, the control circuit 608 can include timing gates to account for round trip time with respect to the ladar pulses targeting each pixel.

It should be understood that the control signal 612 can be effective to select a single sensor 602 at a time or it can be effective to select multiple sensors 602 at a time in which case the multiplexer 604 would select a subset of the incoming sensor signals 610 for further processing by the signal processing circuit 606. Such multiple sensors can be referred to as composite pixels (or superpixels). For example, the array 600 may be divided into an J×K grid of composite pixels, where each composite pixel is comprised of X individual sensors 602. Summer circuits can be positioned between the detector array 600 and the multiplexer 604, where each summer circuit corresponds to a single composite pixel and is configured to sum the readouts (sensor signals 610) from the pixels that make up that corresponding composite pixel.

It should also be understood that a practitioner may choose to include some pre-amplification circuitry between the detector array 600 and the multiplexer 604 if desired.

Figure 6B:
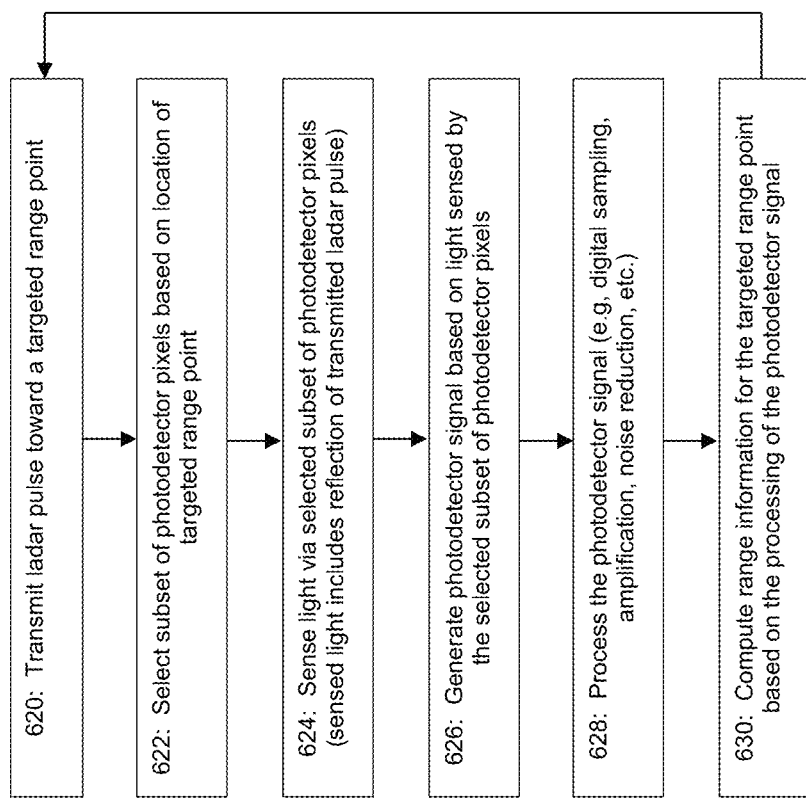
FIG. 6B illustrates an example embodiment of a ladar receiving method which can be used in connection with the example embodiment of FIG. 6A.

FIG. 6B depicts an example ladar receiving method corresponding to the example embodiment of FIG. 6A. At step 620, a ladar pulse is transmitted toward a targeted range point. As indicated above, a location of this targeted range point in a scan area of the field of view can be known by the ladar transmitter. This location can be passed from the ladar transmitter to the ladar receiver or determined by the ladar receiver itself, as explained below.

At step 622, a subset of pixels in the detector array 600 are selected based on the location of the targeted range point. As indicated in connection with FIG. 8, a mapping relationship can be made between pixels of the detector array 600 and locations in the scan area such that if pixel x1,y1 in the scan area is targeted, this can be translated to pixel j1,k1 in the detector array 600. It should be understood that the subset may include only a single pixel of the detector array 600, but in many cases the subset will comprise a plurality of pixels (e.g., the specific pixel that the targeted range point maps to plus some number of pixels that surround that specific pixel). Such surrounding pixels can be expected to also receive energy from the range point ladar pulse reflection, albeit where this energy is expected to be lower than the specific pixel.

At step 624, the selected subset of pixels in the detector array 600 senses incident light, which is expected to include the reflection/return of the ladar pulse transmitted at step 620. Each pixel included in the selected subset will thus produce a signal as a function of the incident sensed light (step 626). If multiple pixels are included in the selected subset, these produced pixel-specific signals can be combined into an aggregated signal that is a function of the incident sensed light on all of the pixels of the selected subset. It should be understood that the detector pixels that are not included in the selected subset can also produce an output signal indicative of the light sensed by such pixels, but the system will not use these signals at steps 626-630. Furthermore, it should be understood that the system can be configured to "zero out" the pixels in the selected subset prior to read out at steps 624 and 626 eliminate the effects of any stray/pre-existing light that may already be present on such pixels.

At step 628, the photodetector signal generated at step 626 is processed. As examples, the photodetector signal can be amplified and digitized to enable further processing operations geared toward resolving range and intensity information based on the reflected ladar pulse. Examples of such processing operations are discussed further below.

At step 630, range information for the targeted range point is computed based on the processing of the photodetector signal at step 628. This range computation can rely on any of a number of techniques. Also, the computed range information can be any data indicative of a distance between the ladar system 100 and the targeted range point 110. For example, the computed range information can be an estimation of the time of transit for the ladar pulse 108 from the transmitter 102 to the targeted range point 110 and for the reflected ladar pulse 112 from the targeted range point 110 back to the receiver 104. Such transit time information is indicative of the distance between the ladar system 100 and the targeted range point 110. For example, the range computation can rely on a measurement of a time delay between when the ladar pulse was transmitted and when the reflected ladar pulse was detected in the signal processed at step 628. Examples of techniques for supporting such range computations are discussed below.

It should be understood that the process flow of FIG. 6B describes an adaptive ladar receiving method where the active sensing region of the detector array 600 will change based on where the ladar pulses are targeted by the ladar transmitter. In doing so, it is believed that significant reductions in noise and improvements in range resolution will be achieved. Further still, as explained in greater detail below, the subset of detector pixels can be adaptively selected based on information derived from the sensed light to further improve performance.

Returning to FIG. 6A, the signal processing circuit 606 can be configured to amplify the selected sensor signal(s) passed by the multiplexer 604 and convert the amplified signal into processed signal data indicative of range information and/or intensity for the ladar range points. Example embodiments for the signal processing circuit 606 are shown by FIGS. 7A and 7B.

Figure 7A:
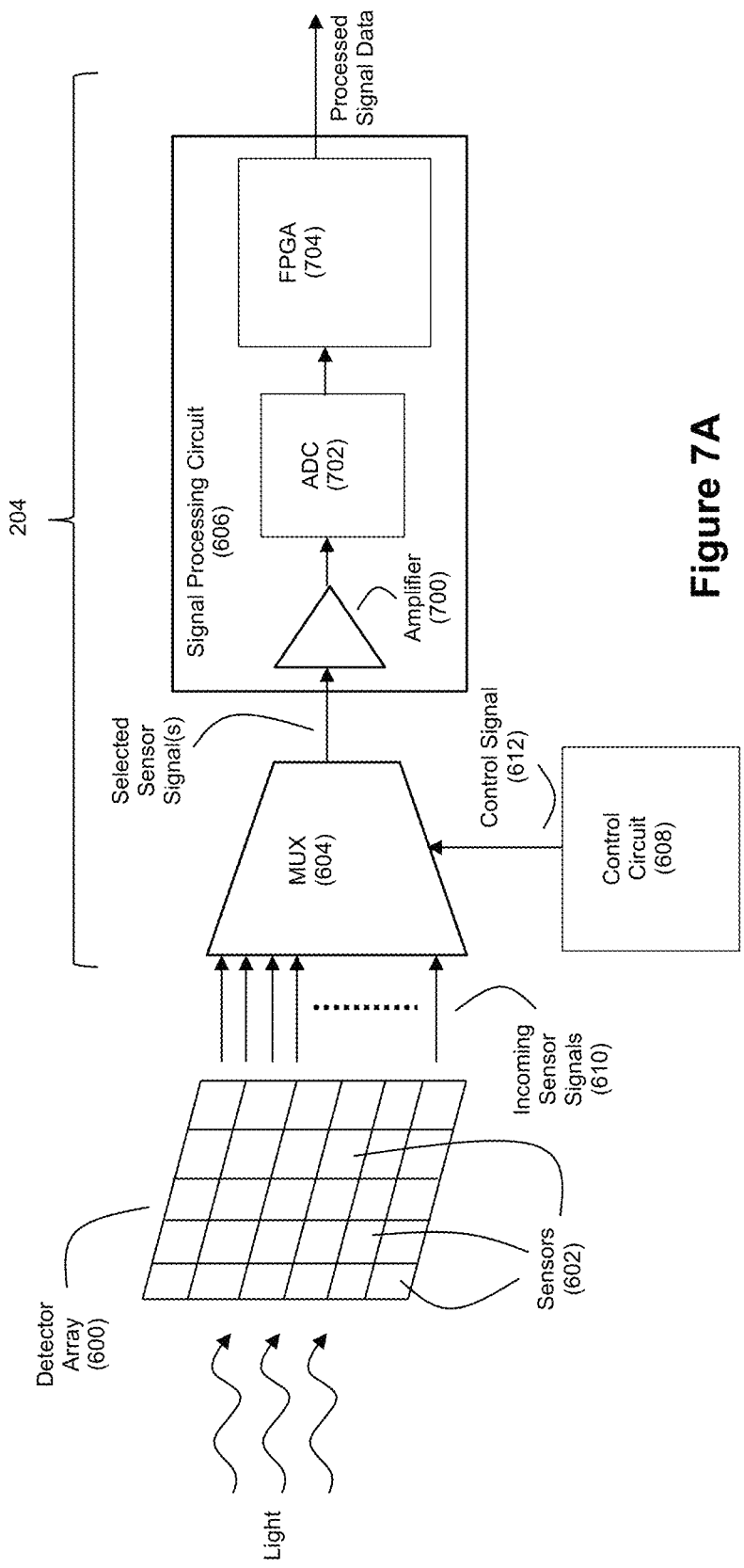
FIG. 7A depicts an example embodiment for a signal processing circuit with respect to the readout circuitry of FIG. 6A.
Figure 7B:
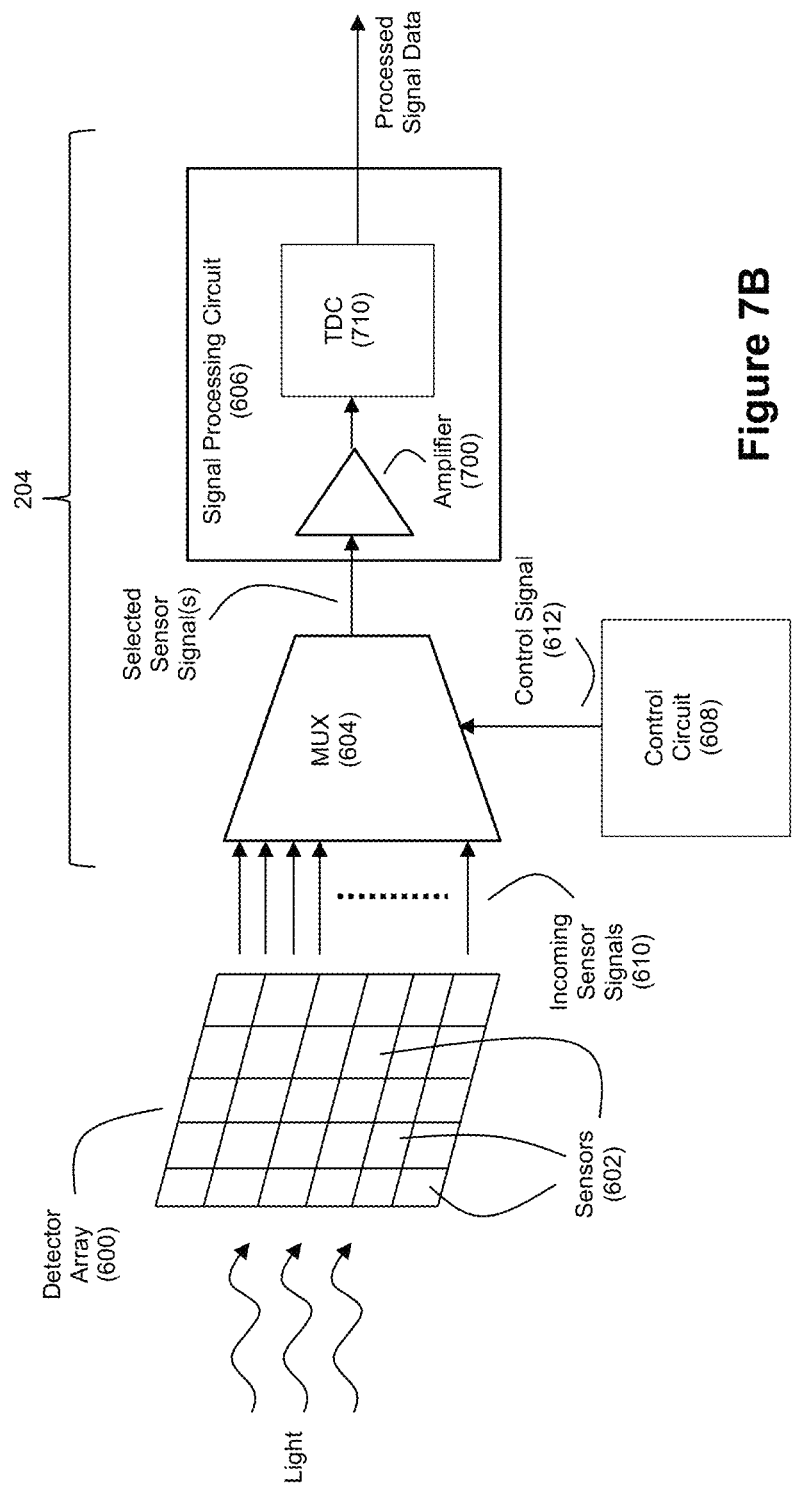
FIG. 7B depicts another example embodiment for a signal processing circuit with respect to the readout circuitry of FIG. 6A.

In the example of FIG. 7A, the signal processing circuit 606 comprises an amplifier 700 that amplifies the selected sensor signal(s), an analog-to-digital converter (ADC) 702 that converts the amplified signal into a plurality of digital samples, and a field programmable gate array (FPGA) that is configured to perform a number of processing operations on the digital samples to generate the processed signal data.

The amplifier 700 can take the form of a low noise amplifier such as a low noise RF amplifier or a low noise operational amplifier. The ADC 702 can take the form of an N-channel ADC.

The FPGA 704 includes hardware logic that is configured to process the digital samples and ultimately return information about range and/or intensity with respect to the range points based on the reflected ladar pulses. In an example embodiment, the FPGA 704 can be configured to perform peak detection on the digital samples produced by the ADC 702. In an example embodiment, such peak detection can be effective to compute range information within +/−10 cm. The FPGA 704 can also be configured to perform interpolation on the digital samples where the samples a curve fit onto a polynomial to support an interpolation that more precisely identifies where the detected peaks fit on the curve. In an example embodiment, such interpolation can be effective to compute range information within +/−5 mm.

When a receiver which employs a signal processing circuit such as that shown by FIG. 7A is paired with a ladar transmitter that employs compressive sensing as described in the above-referenced and incorporated patent applications, the receiver will have more time to perform signal processing on detected pulses because the ladar transmitter would put fewer ladar pulses in the air per frame than would conventional transmitters, which reduces the processing burden placed on the signal processing circuit. Moreover, to further improve processing performance, the FPGA 704 can be designed to leverage the parallel hardware logic resources of the FPGA such that different parts of the detected signal are processed by different hardware logic resources of the FPGA at the same time, thereby further reducing the time needed to compute accurate range and/or intensity information for each range point.

Furthermore, the signal processing circuit of FIG. 7A is capable of working with incoming signals that exhibit a low SNR due to the signal processing that the FPGA can bring to bear on the signal data in order to maximize detection.

In the example of FIG. 7B, the signal processing circuit 606 comprises the amplifier 700 that amplifies the selected sensor signal(s) and a time-to-digital converter (TDC) 710 that converts the amplified signal into a plurality of digital samples that represent the sensed light (including reflected ladar pulses). The TDC can use a peak and hold circuit to detect when a peak in the detected signal arrives and also use a ramp circuit as a timer in conjunction with the peak and hold circuit. The output of the TDC 710 can then be a series of bits that expresses timing between peaks which can be used to define range information for the range points.

The signal processing circuit of FIG. 7B generally requires that the incoming signals exhibit a higher SNR than the embodiment of FIG. 7A, but the signal processing circuit of FIG. 7B is capable of providing high resolution on the range (e.g., picosecond resolution), and benefits from being less expensive to implement than the FIG. 7A embodiment.

Figure 9:
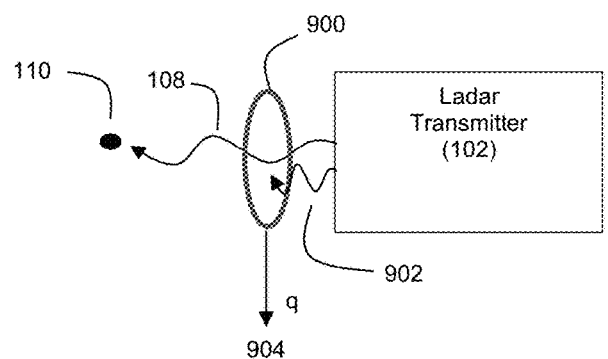
FIG. 9 depicts an example embodiment of a ladar transmitter in combination with a dichroic photodetector.

FIG. 9 discloses an example embodiment where the ladar transmitter 102 and a photodetector 900 are used to provide the ladar receiver 104 with tracking information regarding where the ladar transmitter (via its scanning mirrors) is targeted. In this example, photodetector 900 is positioned optically downstream from the scanning mirrors (e.g., at the output from the ladar transmitter 102), where this photodetector 900 operates as (1) an effectively transparent window for incident light that exhibits a frequency within a range that encompasses the frequencies that will be exhibited by the ladar pulses 108 (where this frequency range can be referred to as a transparency frequency range), and (2) a photodetector for incident light that exhibits a frequency that is not within the transparency frequency range. Thus, the doped/intrinsic layer and the substrate of the photodetector can be chosen so that the ladar pulses 108 fall within the transparency frequency range while light at another frequency is absorbed and detected. The region of the photodetector that exhibits this dual property of transmissiveness versus absorption/detection based on incident light frequency can be housed in an optically transparent/transmissive casing. The electronic circuitry of photodetector 900 that supports the photodetection operations can be housed in another region of the photodetector 900 that need not be transparent/transmissive. Such a photodetector 900 can be referred to as a dichroic photodetector.

The ladar transmitter 102 of FIG. 9 is equipped with a second light source (e.g., a second bore-sighted light source) that outputs light 902 at a frequency which will be absorbed by the photodetector 900 and converted into a photodetector output signal 904 (e.g., photocurrent q). Light 902 can be laser light, LED light, or any other light suitable for precise localized detection by the photodetector 900. The ladar transmitter 102 can align light 902 with ladar pulse 108 so that the scanning mirrors will direct light 902 in the same manner as ladar pulse 108. The photodetector's output signal 904 will be indicative of the x,y position of where light 902 strikes the photodetector 900. Due to the alignment of light 902 with ladar pulse 108, this means that signal 904 will also be indicative of where ladar pulse 108 struck (and passed through) the photodetector 900. Accordingly, signal 904 serves as a tracking signal that tracks where the ladar transmitter is targeted as the transmitter's mirrors scan. With knowledge of when each ladar pulse was fired by transmitter 102, tracking signal 904 can thus be used to determine where the ladar transmitter was aiming when a ladar pulse 108 is fired toward a range point 110. We discuss below how timing knowledge about this firing can be achieved. Tracking signal 904 can then be processed by a control circuit in the ladar receiver 104 or other intelligence within the system to track where ladar transmitter 102 was targeted when the ladar pulses 108 were fired. By knowing precisely where the transmitter is targeted, the system is able to get improved position location of the data that is collected by the receiver. The inventors anticipate that the system can achieve 1 mrad or better beam pointing precision for a beam divergence of around 10 mrad. This allows for subsequent processing to obtain position information on the range point return well in excess of the raw optical diffraction limit.

Figure 10A:
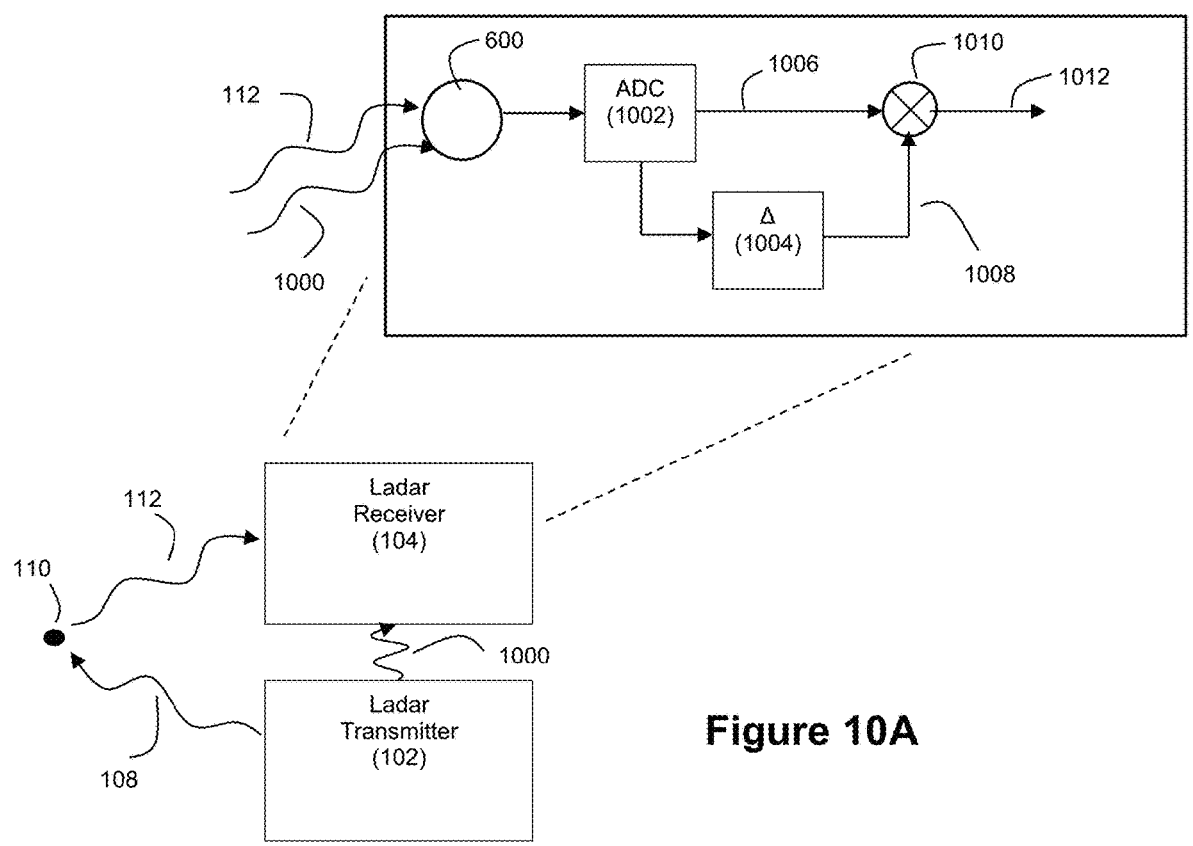
FIG. 10A depicts an example embodiment where the ladar receiver employs correlation as a match filter to estimate a delay between pulse transmission and pulse detection.

We will now discuss time of transmit and time of receipt for laser light. FIG. 10A discloses an example embodiment where an optical path distinct from the path taken by ladar pulse 108 from the transmitter 102 toward a range point and back to the receiver 104 via ladar pulse reflection 112 is provided between the ladar transmitter 102 and ladar receiver 104, through which reference light 1000 is communicated from transmitter 102 to receiver 104, in order to improve range accuracy. Furthermore, this distinct optical path is sufficient to ensure that the photodetector 600 receives a clean copy of the reference light 1000.

This distinct optical path can be a direct optical path from the transmitter 102 to the receiver's photodetector 600. With such a direct optical path, the extra costs associated with mirrors or fiber optics to route the reference light 1000 to the receiver's photodetector 600 can be avoided. For example, in an arrangement where the transmitter and receiver are in a side-by-side spatial arrangement, the receiver 104 can include a pinhole or the like that passes light from the transmitter 102 to the photodetector 600. In practice this direct optical path can be readily assured because the laser transmit power is considerably stronger than the received laser return signal. For instance, at 1 km, with a 1 cm receive pupil, and 10% reflectivity, the reflected light sensed by the receiver will be over 1 billion times smaller than the light at the transmitter output. Hence a small, um scale, pinhole in the ladar receiver casing at 104, with the casing positioned downstream from the output of mirror 904 would suffice to establish this direct link. In another embodiment, a fiber optic feed can be split from the main fiber laser source and provide the direct optical path used to guide the reference light 1000, undistorted, onto the photodetector.

The reference light 1000, spawned at the exact time and exact location as the ladar pulse 108 fired into the environment, can be the same pulse as ladar pulse 108 to facilitate time delay measurements for use in range determinations. In other words, the reference light 1000 comprises photons with the same pulse shape as those sent into the field. However, unlike the ladar pulse reflection from the field, the reference light pulse is clean with no noise and no spreading.

Thus, as shown in the example expanded view of the ladar receiver 104 in FIG. 10A, the photodetector 600 receives the reference pulse 1000 via the distinct optical path and then later the reflected ladar pulse 112. The signal sensed by the photodetector 600 can then be digitized by an ADC 1002 and separated into two channels. In a first channel, a delay circuit/operator 1004 delays the digitized signal 1006 to produce a delayed signal 1008. The delayed signal 1008 is then compared with the digitized signal 1006 via a correlation operation 1010. This correlation operation can be the multiplication of each term 1006, 1008 summed across a time interval equal to or exceeding the (known) pulse length. As signal 1006 effectively slides across signal 1008 via the correlation operation 1010, the correlation output 1012 will reach a maximum value when the two signals are aligned with each other. This alignment will indicate the delay between reference pulse 1000 and reflected pulse 112, and this delay can be used for high resolution range determination. For example, suppose, the reference light signal 1000 arrives 3 digital samples sooner than the reflected ladar pulse 112. Assume these two signals are identical (no pulse spreading in the reflection), and equal, within a scale factor, {1,2,1}, i.e. the transmit pulse lasts three samples. Then for a delay of zero in 1004, summing twice the pulse length, the output is {1,2,1,0,0,0} times {0,0,0,1,2,1}. Next suppose we delay by 1 sample in 1004. Then the output is sum[{0,1,2,1,0,0} times {0,0,0,1,2,1}]=1. If we increment the delay by 1 sample again, we get 4 as the correlation output 1012. For the next sample delay increment, we get a correlation output of 6. Then, for the next sample delay increment, we get a correlation output of 4. For the next two sample delay increments we get correlation outputs of 1 and then zero respectively. The third sample delay produces the largest correlation output, correctly finding the delay between the reference light and the reflected ladar pulse. Furthermore, given that for a range of 1 km, the transmitter can be expected to be capable of firing 150,000 pulses every second, it is expected that there will be sufficient timing space for ensuring that the receiver gets a clean copy of the reference light 1000 with no light coming back from the ladar pulse reflection 112. The delay and correlation circuit shown by FIG. 10A can also be referred to as a matched filter. The matched filter can be implemented in an FPGA or other processor that forms part of signal processing circuit 606.

While the example of FIG. 10A shows a single photodetector 600 and ADC 1002 in the receiver, it should be understood that separate photodetectors can be used to detect the return pulse 112 and the reference pulse 1000. Also, separate ADCs could be used to digitize the outputs from these photodetectors. However, it is believed that the use of a single photodetector and ADC shared by the return pulse 112 and reference pulse 114 will yield to cost savings in implementation without loss of performance. Also, interpolation of the sampled return pulse 112 can be performed as well using pulse 1000 as a reference. After peak finding, conducted using the process described above, the system can first interpolate the reference light signal. This can be done using any desired interpolation scheme, such as cubic spline, sine function interpolation, zero pad and FFT, etc. The system then interpolates the receive signal around the peak value and repeats the process described above. The new peak is now the interpolated value. Returning to our previous example, suppose we interpolate the reference light pulse to get {1,1.5,2,1.5,1,0,0,0,0,0,0}, and we interpolate the receive pulse likewise to get {0,0,0,1,1,5,2,1,5,1}. Then the system slides, multiplies, and sums. The advantage of this, over simply "trusting" the ladar return interpolation alone, is that the correlation with the reference light removes noise from the ladar return.

Figure 10B:
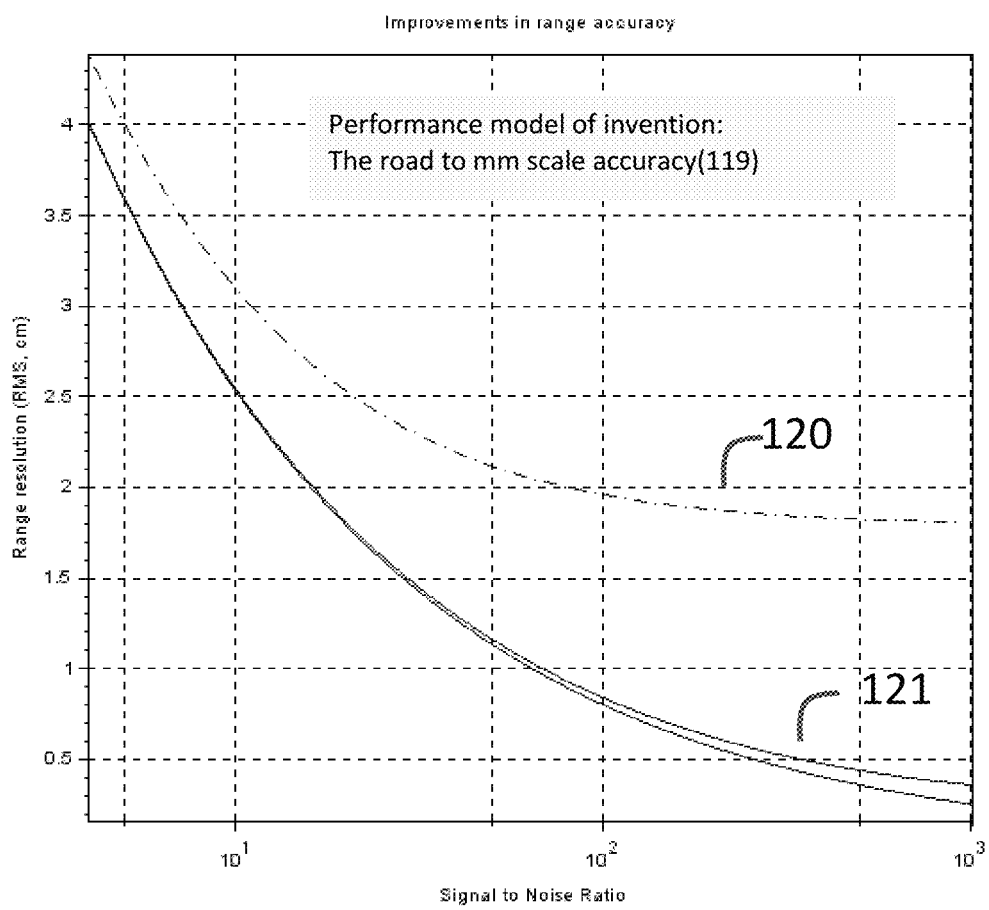
FIG. 10B depicts a performance model for the example embodiment of FIG. 10A.

Making reference pulse 1000 the same as ladar pulse 108 in terms of shape contributes to the improved accuracy in range detection because this arrangement is able to account for the variation in pulse 108 from shot to shot. Specifically, range is improved from the shape, and reflectivity measurement is improved by intensity, using pulse energy calibration (which is a technique that simply measures energy on transmit). The range case is revealed in modeling results shown by FIG. 10B. The vertical axis of FIG. 10B is range accuracy, measured as ±x cm, i.e. x standard deviations measured in cm, and the horizontal axis of FIG. 10B is the SNR. This model is applied to a 1 ns full width half maximum Gaussian pulse. The bottom line plotted in FIG. 10B is the ideal case. The nearby solid line 121 is the plot for an ADC with 1 picosecond of timing jitter, which is a jitter level readily available commercially for 2 GHz ADCs. By comparing the performance of the two curves indicated below 121, one can see from FIG. 10B that jitter is not a limiting factor in achieving sub-cm resolution. Specifically the lower curve (no jitter) and upper curve (jitter) differ by only a millimeter at very high (and usually unachievable) SNR [~1000]. However, pulse variation is a significant limitation. This is seen by 120, which is the performance available with 5% pulse-to-pulse shape variation, a common limit in commercial nanosecond-pulsed ladar systems. The difference between 120 and 121 is the improvement achieved by example embodiments of the disclosed FIG. 10A technique, for both peak finding and interpolation as a function of SNR.

We conclude the discussion of range precision by noting that the computational complexity of this procedure is well within the scope of existing FPGA devices. In one embodiment, the correlation and interpolation can be implemented after a prior threshold is crossed by the data arriving from the reflected lidar pulse. This greatly reduces complexity, at no performance cost. Recall, the intent of correlation and interpolation is to improve ranging—not detection itself, so delaying these operations and applying them only around neighborhoods of detected range returns streamlines computations without eroding performance. Typically only 3 samples are taken of the reference light pulse since it is so short. Interpolating this 20-fold using cubic models requires only about 200 operations, and is done once per shot, with nominally 100,000 shots. The total burden pre matching filter and interpolation against the ladar receive pulse is then 20 Mflops. If we select the largest, first and last pulse for processing, this rises to less than 100 Mflop, compared to teraflops available in modern commercial devices.

Figure 11A:
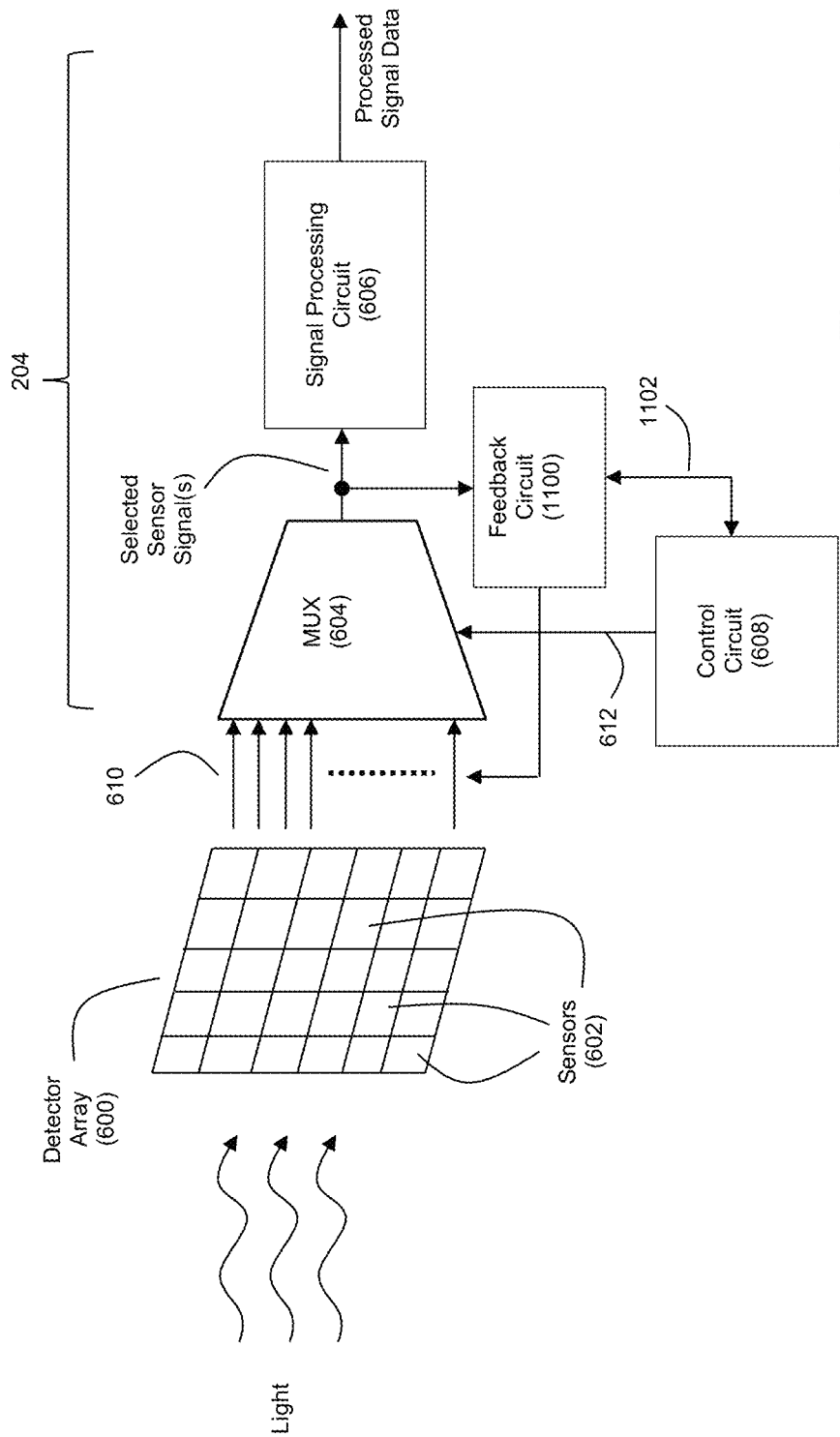
FIG. 11A depicts an example embodiment of a receiver that employs a feedback circuit to improve the SNR of the sensed light signal.

Furthermore, FIG. 11A discloses an example embodiment of a receiver design that employs a feedback circuit 1100 to improve the SNR of the signals sensed by the active sensors/pixels 602. The feedback circuit 1100 can be configured as a matching network, in resonance with the received ladar pulse return 112 (where the ladar pulse 108 and return pulse 112 can exhibit a Gaussian pulse shape in an example embodiment), thereby enhancing the signal and retarding the noise. A photodetector performance is a function of pitch (area of each element) and bandwidth. Passive imagers lack prior knowledge of incident temporal signal structure and have thus no ability to tune performance. However, in example embodiments where the ladar transmitter employs compressive sensing, the transmitted ladar pulse 108 is known, as it is arrival time within the designated range swath. This knowledge can facilitate a matching network feedback loop that filters the detector current, increases signal strength, and filters receiver noise. A feedback gain provided by the feedback circuit can be controlled via a control signal 1102 from control circuit. Furthermore, it should be understood that the control circuit 608 can also be in communication with the signal processing circuit 606 in order to gain more information about operating status for the receiver.

The matching network of the feedback circuit 1100 may be embedded into the In—GaAs substrate of detector 600 to minimize RF coupling noise and cross channel impedance noise. The cost of adding matching networks onto the detector chip is minimal. Further, this matching allows us to obtain better dark current, ambient light, and Johnson noise suppression than is ordinarily available. This further reduces required laser power, which, when combined with a 1.5 um wavelength for ladar pulses 108 leads, to a very eye safe solution. The matching network can be comprised of more complex matching networks with multiple poles, amplifiers, and stages. However, a single pole already provides significant benefits. Note that the input to the signal processing circuit 606 can be Gaussian, regardless of the complexity of the multiplexer, the feedback, or the size variability of the pixels, due to the convolutional and multiplicative invariance of this kernel.

Figure 11B:
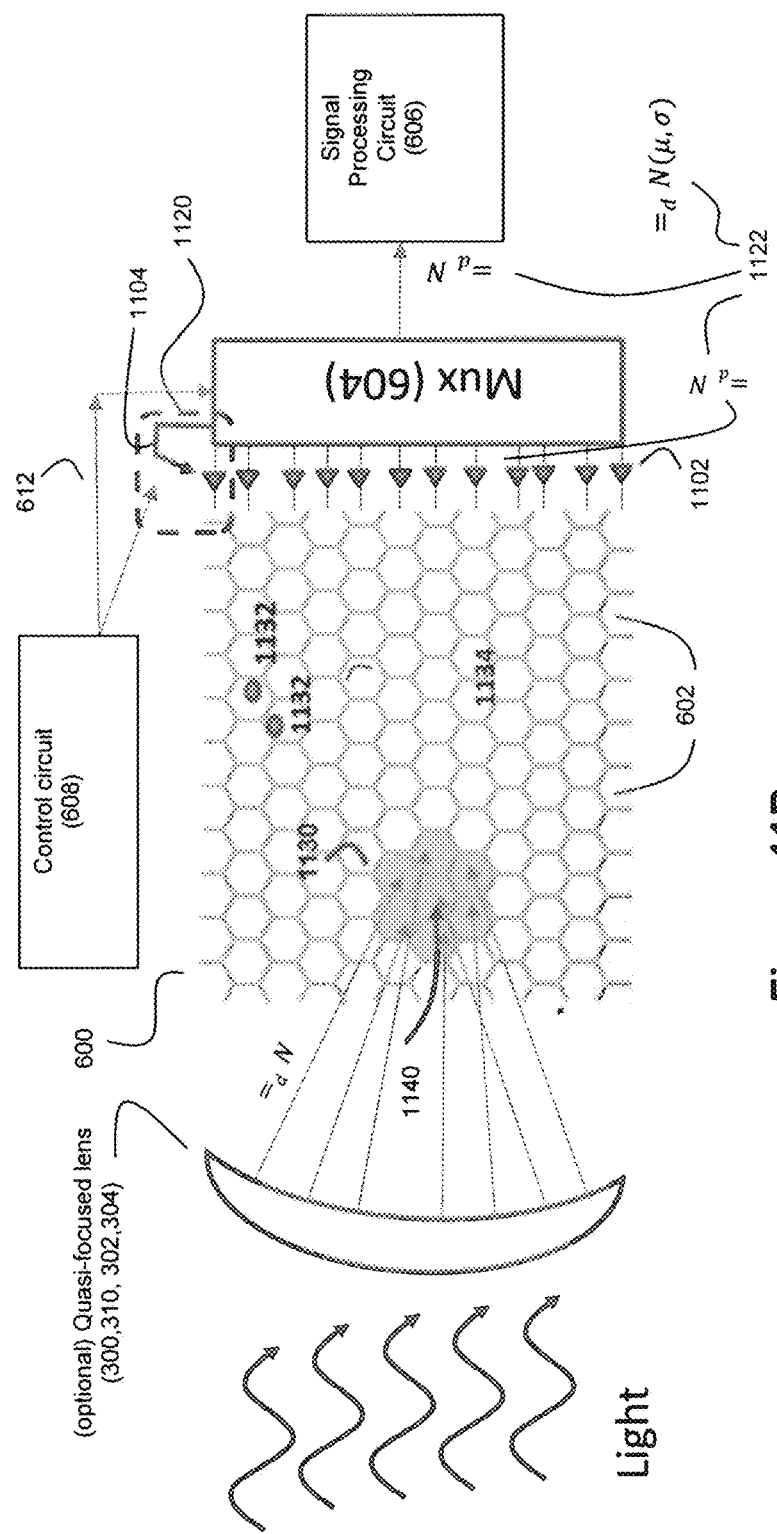
FIG. 11B depicts another example embodiment relating to the feedback circuit design.

FIG. 11B shows an example that expands on how the feedback circuit 1100 can be designed. The matching network involves one or more amplifiers 1102, in a controlled feedback loop 1104 with a gain controller furnished by the control circuit 608. The matching network can be present on all the input lines to the mux 604, and FIG. 11B shows just show a single such network, within the dotted box 1120, for ease of illustration. The feedback gain is generally chosen to output maximal SNR using differential equations to model the input/output relationships of the feedback circuit. In practice the control loop can be designed to monitor the mux output and adjust the amplifiers 1102 to account from drift due to age, thermal effects, and possible fluctuations in ambient light. Embodiments are also disclosed herein which employ two or more digital channels to build a filter (e.g. a Weiner filter or least mean squares filter) to reject interference from strong scatterers, other ladar pulses, or even in-band sunlight, headlights or other contaminants. Also, the feedback circuit can be reset at each shot to avoid any saturation from contamination in the output from shot to shot.

Feedback control can be vastly simplified if a Gaussian pulse shape is used for ladar pulse 108 in which case all the space time signals remain normally distributed, using the notation in 1122. Accordingly, in an example embodiment, the ladar pulse 108 and its return pulse 112 can exhibit a Gaussian pulse shape. In such an example embodiment (where the laser pulse 108 is Gaussian), the Fourier representation of the pulse is also Gaussian, and the gain selection by, the control circuit 608 is tractable, ensuring rapid and precise adaptation.

Another innovative aspect of the design shown by FIG. 11B is the use of hexagonally shaped pixels for a plurality of the sensors 602 within the photodetector array 600. The shaded area 1130 indicates the selected subset of pixels chosen to pass to the signal processing circuit 606 at a given time. By adaptively selecting which pixels 602 are selected by the multiplexer 604, the receiver can grow or shrink the size of the shaded area 1130, either by adding or subtracting pixels/sensors 602. The hexagonal shape of pixels/sensors 602 provides a favorable shape for fault tolerance since each hexagon has 6 neighbors. Furthermore, the pixels/sensors 602 of the photodetector array 600 can exhibit different sizes and/or shapes if desired by a practitioner. For example, some of the pixels/sensors can be smaller in size (see 1132 for example) while other pixels/sensors can be larger in size (see 1134). Furthermore, some pixels/sensors can be hexagonal, while other pixels/sensors can exhibit different shapes.

Figure 12:
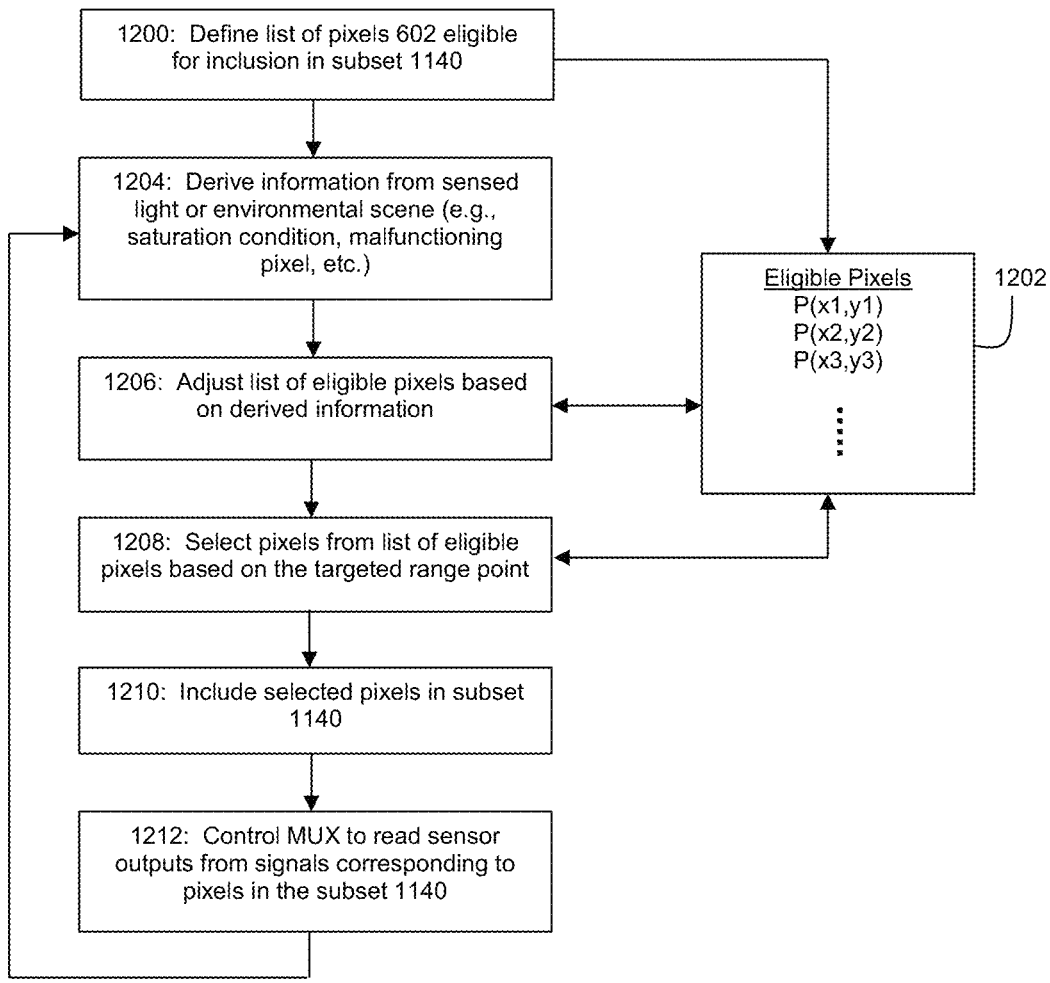
FIG. 12 depicts an example process flow for an intelligently-controlled adaptive ladar receiver.

FIG. 12 depicts an example process flow for implementing adaptive control techniques for controlling how the receiver adapts the active region of the photodetector array 600. At step 1200, a list of pixels eligible for inclusion in subset 1130 is defined. This list can be any data structure 1202 that includes data indicative of which pixels 602 are eligible to be selected for inclusion in the subset 1130. Such a data structure may be maintained in memory that is accessible to a processor that implements the FIG. 12 process flow. While the example of FIG. 12 shows a list 1202 that identifies eligible pixels 602, it should be understood that data structure 1202 could also serve as an effective blacklist that identifies pixels that are ineligible for inclusion in subset 1130.

At step 1204, a circuit (e.g., signal processing circuit 606 and/or control circuit 608), which may include a processing logic (e.g., an FPGA) and/or other processor, operates to derive information from the light sensed by the array 600 (which may be sensed by a subset of pixels 602 that are active in the array) or from the environmental scene (e.g., by processing camera/video images). This derived information may include information such as whether any saturation conditions exist, whether any pixels are malfunctioning, whether there are any areas of high noise in the field of view, etc. Examples of derived information that can be useful for adaptive control are discussed below. Furthermore, it should be understood that the oversaturation conditions can be attributed to specific pixels (e.g., pixels that are blinded by intense incident light) and/or can be attributed to the aggregated signal resulting from the combination of pixel readings by the pixels included in subset 1130 (where the aggregation of pixel outputs oversaturates the linear operating range of the processing circuitry).

At step 1206, the list of eligible pixels 1202 is adjusted based on the information derived at step 1204. For example, if a given pixel is found to be malfunctioning as a result of step 1204, this pixel can be removed from list 1202 at step 1206. Similarly, any oversaturated pixels can be removed from the list 1202 and/or any pixels corresponding to overly noisy areas of the field of view (e.g., regions where the noise exceeds a threshold) can be removed from list 1202 at step 1206.

Next, at step 1208, the system selects pixels from the list 1202 of eligible pixels based on the targeted range point. This can be performed as described in connection with step 804 of FIG. 8, but where list 1202 defines the pool of pixels eligible to be selected as a function of the location of the targeted range point in the scan area/field of view. Thus, if the targeted range point is mapped to pixel 1140 in the array and the subset 1130 would have ordinarily included all of the pixels that neighbor pixel 1140, the adaptive control technique of FIG. 12 may operate to define subset 1130 such that the upper left neighboring pixel of pixel 1140 is not included in subset 1130 if the upper left neighboring pixel was removed from list 1202 at step 1206 (e.g., due to a detected malfunction or the like). Furthermore, it should be understood that step 1208 may also operate to use the information derived at step 1204 to affect which eligible pixels are included in the subset. For example, additional pixels might be added to the subset 1130 to increase the size of the active sensor region based on the derived information. Similarly, the size of the active sensor region might be shrunk by using fewer pixels in the subset 1130 based on the derived information. Thus, it should also be understood that the size of the active region defined by the selected subset 1130 may fluctuate from shot to shot based on information derived at step 1204.

At step 1210, the pixels selected at step 1208 are included in subset 1130, and the MUX is then controlled to read/combine the outputs from the pixels that are included in the selected subset 1130 (step 1212). Thereafter, the process flow returns to step 1204 for the next ladar pulse shot. Accordingly, it can be seen that the process flow of FIG. 12 defines a technique for intelligently and adaptively controlling which pixels in array 600 are used for sensing ladar pulse returns.

Furthermore, it should be understood that the FIG. 12 process flow can also be used to impact transmitter operation. For example, the list of eligible pixels (or a list of ineligible pixels) can be provided to the ladar transmitter for use by the ladar transmitter to adjust the timing/order of shots on its shot lists (e.g., avoiding shots that will likely be corrupted by noise on receive). Further still, as an example, if the information derived at step 1204 indicates that the aggregated signal produced by MUX 604 is oversaturated, the ladar transmitter can reduce the power used by the ladar pulses 108 to reduce the likelihood of oversaturation on the receive side. Thus, when such oversaturation corrupts the receiver, the ladar transmitter can repeat the corrupted shot by reducing the power for ladar pulse 108 and re-transmitting the reduced power pulse.

Also disclosed herein are specific examples of control techniques that can be employed by the ladar system. While each control technique will be discussed individually and should be understood as being capable of implementation on its own, it should also be understood that multiples of these control techniques can be aggregated together to further improve performance for the adaptive receiver. As such, it should be understood that in many instances aggregated combinations of these control techniques will be synergistic and reinforcing. In other cases, tradeoffs may exist that are to be resolved by a practitioner based on desired operating characteristics for the receiver.

Adaptive Fault Tolerance Mask:

With a conventional imaging array, a dead pixel typically leads to irrecoverable loss. However, with the adaptive control features described herein, a malfunctioning pixel 602 has minimal effect. Suppose for example that we have an array 600 of 500 pixels 602. Then suppose we have a lens that maps the far field scene to a 7-pixel super/composite pixel 1130 (a specified pixel 1140 and its neighbors). Losing one pixel leads to a loss of ⅐ of the net photon energy. If the detector array is shot noise-limited, then we have only a 7% loss in energy, versus 100% loss for a full imaging array. An example control flow for a fault tolerant adaptive mask is shown below as applied to an embodiment where the ladar transmitter employs compressive sensing. It should be understood that a mask can be used by the control circuit 608 to define which pixels 602 are included in the selected subset of active sensors and which are not so included. For example, the mask can be a data signal where each bit position corresponds to a different pixel in the array 600. For bit positions having a value of "1", the corresponding pixel 602 will be included in the selected subset, while for bit positions having a value of "0", the corresponding pixel 602 would not be included in the selected subset.

A pixel 602 that is unable to detect light (i.e., a "dead" pixel or a "dark" pixel) should not be included in the selected subset because such a dead pixel would add noise but no signal to the aggregated sensed signal corresponding to the composite pixel defined by the selected subset. Furthermore, it should be understood that malfunctioning pixels are not limited to only dead pixels. A pixel 602 that produces an output signal regardless of whether incident light is received (e.g., a "stuck" pixel or a "white" pixel) should also be omitted from the selected subset. In fact, a white pixel may be even worse than a dark pixel because the stuck charge produced by the white pixel can lead to a constant bright reading which adds glare to all returns in the composite pixel. An example control process flow is described below for generating an adaptive fault tolerant mask that can adjust which pixels 602 are included in the selected subset based on which pixels 602 are detected as malfunctioning:

1: select a background pixel status probe shot schedule repetition rate (e.g., nominally one per hour)
2: Decompose: In the past previous time block T identify S, the set of pixels not yet selected for illumination. Decompose into S1, S2, the former being addressable (strong return in scene) while the latter is defined to be non-addressable (ex: above horizon). Note that S1, S2 are time varying.
3: Shot list: Enter S1, S2 into the shot list.
4: construct a mask to deselect faulty tiles identified from analysis of returns from 1-3 (either no return or anomalous gain), The super-pixel size can be set based on the lens and tile pitch but can nominally be 7.
5: recurse 1-4.
6: average: In the above, as necessary, apply running averages on pixel probe, and include adaptive metrology.

Fault tolerance in this fashion can be a useful step in improving safety, since without mitigation single defects can render an entire FOV inoperative.

Adaptive Mask to Control Dynamic Range:

The adaptive control over which subsets of pixels are activated at a given time can also be used to adjust the dynamic range of the system. Based on range knowledge, the signal produced by a composite pixel will have predictable intensity. A mask can be constructed that reduces (or increases) the dynamic range of the return at the ADC pre-filter and/or the ADC itself by adjusting the size of the composite pixel defined by the pixels 602 included in the selected subset. For example, if the typical composite pixel is 7 pixels (see 1130 in FIG. 11B), adjusting the subset such that it drops from 7 pixels to a single pixel reduces the energy by 7 times (or roughly three bits). Photodetectors measure energy of light, not amplitude of light. As a result, the ADCs dynamic range is the square of that for conventional communications and radar circuits which measure amplitude. As a result, properly controlling dynamic range is a technical challenge for laser systems. For example, a ladar system tuned to operate over 10-500 m will, for a fixed reflectivity and laser power, undergo a signal return dynamic range change by 2500. If a nearby object saturates the receiver, a farther out target will be lost. Therefore, an example embodiment can include an analysis of prior shot range returns in the instantaneous field of view to assess the need to excise any pixels from the selected subset in the mux circuit. As a result, there may be a desire for having the MUX drop the sensor signal(s) from one or more pixels of the region 1130, as outlined below. An example control process flow is described below for generating an adaptive mask for controlling the dynamic range of the return signal:

1, Inspect range return from a pulse return of interest, obtained from either selective or compressive sensing.

2. Identify any saturation artifacts, as evidenced by ADC reports at the MSB (most significant bit) for several range samples.
3. Map the saturated range sample to a precise azimuth and elevation of origin. This may involve exploring adjacent cells to determine origin from context, particularly at longer range as beam divergence is more pronounced.
4. Modify the mask to reduce saturation by blocking the pixels that present a larger gain in the origin identified in 3.
5. Modify the mask further by selecting only smaller area pixels as required.

Adaptive Mask to Remove Interfering Ladar Pulse Collisions:

Another potential source of noise in the light sensed by the receiver is a collision from an interfering ladar pulse. For example, in an application where the ladar system is employed on moving automobiles, the incoming light that is incident on the photodetector array 600 might include not only a ladar pulse return 112 from the vehicle that carries the subject ladar system but also a ladar pulse or ladar pulse return from a different ladar system carried by a different vehicle (an interfering "off-car" pulse). Adaptive isolation of such interfering pulses can be achieved by creating a sub-mask of selected pixels 602 by excising pixels associated with strong interfering pulses from other ladar systems. The above-referenced and incorporated patent applications describe how pulse encoding can be employed to facilitate the resolution as to which ladar pulses are "own" pulses and which are "off" pulses (e.g., "off-car" pulses). For example, consider that such encoding is used to detect that pixel 1134 contains energy from an interfering ladar pulse. We would then scan through the pixels of the array (with the cluster 1130 for example) to see which are receiving interference. In one embodiment, this would involve removing the "own" lidar pulse using encoding, measuring the resulting signal after subtraction, and comparing to a predetermined threshold. In another embodiment, the system would simply analyze the MUX output, subtract off the "own" pulse encoding signal and compare the remainder to a threshold. The embodiment will depend on the severity of interference encountered, and processor resources that are available. Upon such detection, the control circuit 608 can remove this pixel 1134 from a list of eligible pixels for inclusion in a selected subset while the interfering pulse is registered by that pixel 1132.

The system might also remove pixels based on headlight source localization from passive video dining night time operations (the operational conservative assumption here being that every vehicle with a headlight has a ladar transmitter). Furthermore, since pulse collision detection can be used to reveal off-car pulses, this information can be used to treat any selected off car laser source as a desired signal, subtract off the rest (including own-car ladar pulses) and scan through pixels of the array to find where this interference is largest. In doing so we will have identified the source of each interfering ladar source, which can then be subsequently removed.

Adaptive Mask for Strong Scatterer Removal:

Another potential source of noise in the light sensed by the receiver is when a ladar pulse strikes an object that exhibits a strong scattering effect (e.g., a strongly slanted and reflective object as opposed to a more ideally-oriented object that is perpendicular to the angle of impact by the ladar pulse 108). Targets exhibiting multiple returns have information bearing content. However, this content can be lost due to excessive dynamic range, because the largest return saturates driving the receiver into nonlinear modes, and/or driving the weaker returns below the sensor detection floor. Typically, the direct return is the largest, while successive returns are weakened by the ground bounce dispersion, but this is not the case when reflectivity is higher in bounce returns. In either case, it is desirable to adjust the mask so that the near-in range samples receive a higher pupil (dilation) (e.g., where the selected subset defines a larger area of the array 600), while the farther out range samples undergo pupil contraction (e.g., where the selected subset defines a smaller area of the array 600). At far range there will be large angular extent for the laser spot. It is possible for strong near-range scatterer pulse returns to arrive within the data acquisition window for the transmitted pulse. The use of an adaptive mask will allow for the removal of this scatterer by over-resolving the spot beam (e.g., more than one pixel covered by the shot return beam) on receive, thereby reducing saturation or scatterer leakage into the target cell. For example suppose, notionally we observe that the range returns begin at 1134, migrate to the doublet at 1132 and at closest range appear at 1130. We can then instruct the control circuit to modify the mask by choosing different mux lines as the laser pulse sweeps across the sensor array.

Adaptive Shot Timing Linked to Mask Feedback Control:

In compressive sensing, the dynamic range can be further reduced by deliberately timing the laser pulse by the transmitter so that the laser peak intensity does not fall on the target but instead falls away from near-to-the-target interference, thereby increasing the signal to clutter ratio. This allows for near-in interference suppression above and beyond that obtained by other means. For example, suppose, notionally, that the upper sensor cell 1132 contains a very strong target and the lower nearby sensor cell also labeled 1132 contains a target. Then we can set the shot timing to move the received pulse shot illumination away from the 1132 doublet and center it more towards 1130. We are using here the flexibility in shot timing (provided via compressive sensing), knowledge of beam pointing on transmit (see FIG. 9), and selectivity in sensor elements (see FIG. 11B, for example) to optimally tune the receiver and transmitter to obtain the best possible signal quality. By ensuring the mask is tuned so that the beam peak of the receive beam is away from a noise source (e.g., incoming traffic) we can reduce strong returns from nearby vehicles while imaging at distance, a milliradian in some cases suffices to reduce strong scatterers by 95% while attenuating the target object by only a few percent. In an example embodiment, selective sensing can be used to determine the mask parameters, although compressive sensing, or fixed roadmap-based solutions may also be chosen. An example here is lane structure, since opposing lane traffic yields the largest interference volume. The system could thereby adjust the shots, or the ordering of shots to avoid noisy areas while retaining the desired object information.

Adaptive Mask for Dynamic Range Mitigation by Mask Mismatch:

If the mask in 1130 is chosen to provide the largest ladar reflection measurement, the center pixel will have the most energy. Therefore it will saturate before any of the others. Therefore one approach for reducing saturation risk is to simply remove the center pixel from the mask 1130 if evidence of, or concern regarding, saturation is present.

Adaptive Mask for Power-Coherent interference Rejection:

One benefit of the advanced receiver disclosed herein is that only a single data channel is needed, as opposed to M where M is the pixel count. However, one can still retain a low cost and swap system by adding a second channel. This second channel, like the first channel, can either be a full up analog to digital converter (see FIG. 7A) or a time of flight digitizer (see FIG. 7B). Either embodiment allows for coherent combining (in intensity) to optimally suppress the interference using filtering (such as Weiner Filtering or Least Means Squared (LMS) Filtering). With two channels x,y and with the target return weighting being $w_x$, $w_y$, this is equivalent to solving for the weights and applying the weights to the data so that the SNR of $w_x x + w_y y$ is maximized. Through such an adaptive mask, the spatially directional noise component in the sensed light signal can be reduced.

The embodiments of FIGS. 6A-12 can be particularly useful when paired with detection optics such as those shown by FIGS. 4 and 5A, where the sensed light is imaged onto the detector array 600. In embodiments where the image pulse is not imaged onto the detector array 600 (e.g., the embodiments of FIGS. 3A, 3B, and 5B (or embodiments where the image is "blurry" due to partial imaging), then a practitioner may choose to omit the multiplexer 604 as there is less of a need to isolate the detected signal to specific pixels.

Figure 13A:
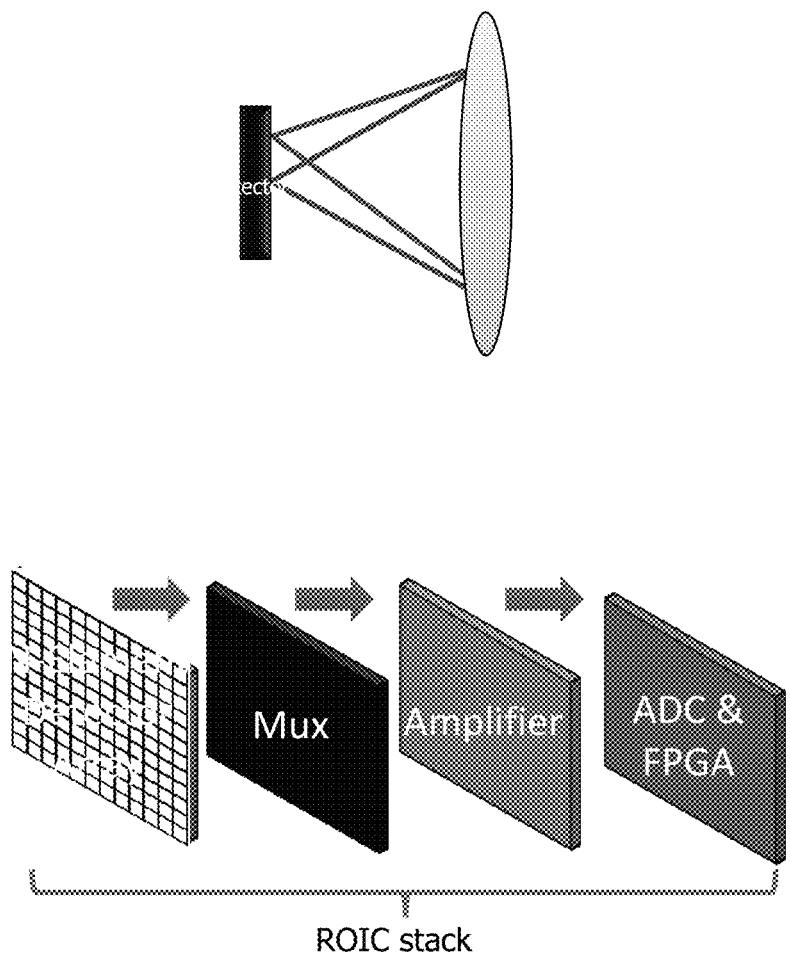
FIG. 13A depicts an example ladar receiver embodiment.
Figure 13B:
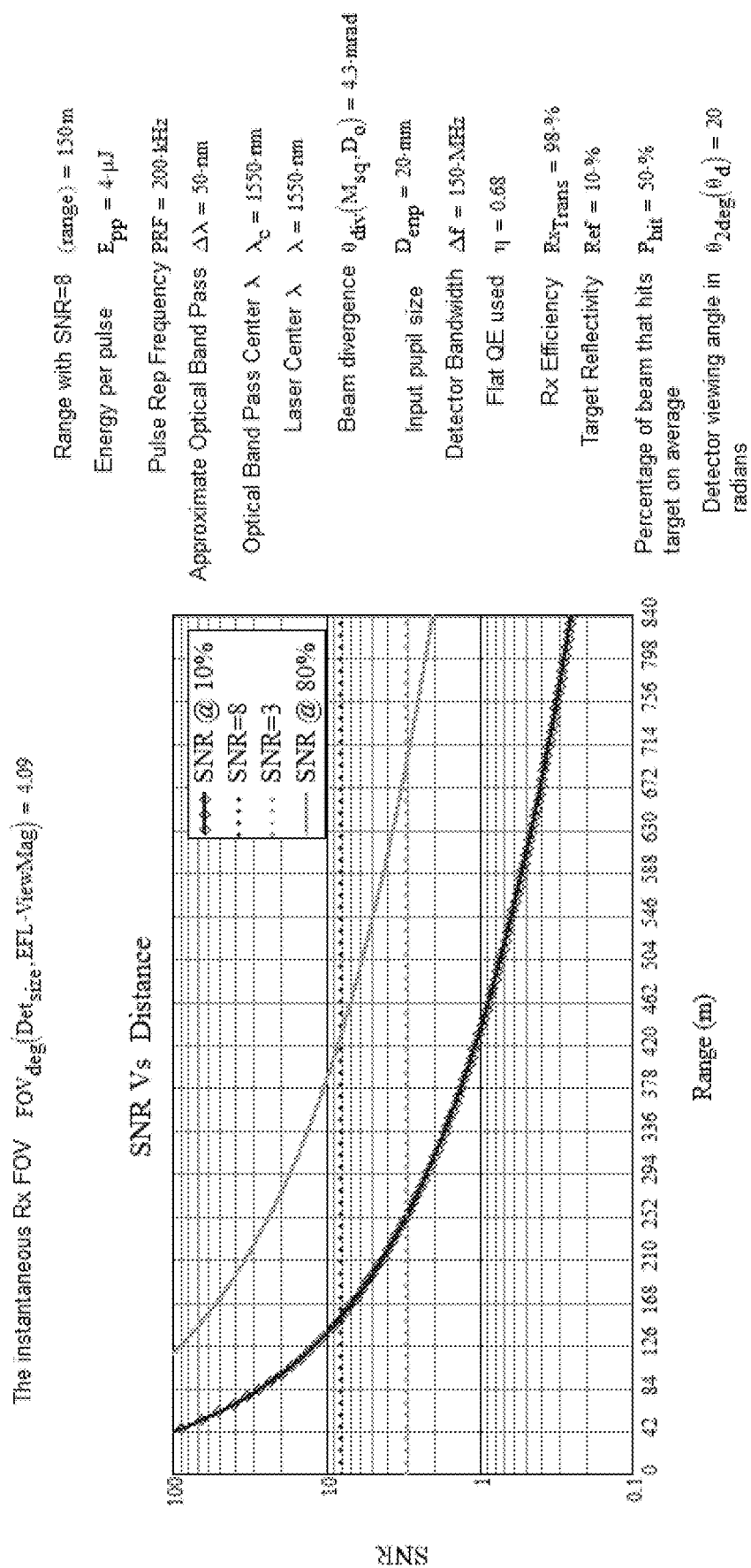
FIG. 13B depicts a plot of signal-to-noise ratio (SNR) versus range for daytime use of the FIG. 13A ladar receiver embodiment as well as additional receiver characteristics.

FIG. 13A depicts an example ladar receiver embodiment where "direct to detector" detection optics such as that shown by FIG. 5A are employed and where the readout circuitry of FIG. 7A is employed. In this example, the ladar receiver is designed with an approximately 60×60 degree FOV, and an approximate 150 m range (@SNR=8, 10% reflectivity). The receiver employs a low number N-element detector array such as a silicon or InGaAs PIN/APD array. When using an InGaAs PIN array, the receiver may exhibit a 2 cm input aperture, a 14 mm focal length, and it may work in conjunction with an approximately 0.2-5.0 nanosecond laser pulse of around 4 microJoules per pulse. Spatial/angular isolation may be used to suppress interference, and a field lens may be used to ensure that there are no "dead spots" in the detector plane in case the detectors do not have a sufficiently high fill factor. FIG. 13B depicts a plot of SNR versus range for daytime use of the FIG. 13A ladar receiver embodiment. FIG. 13B also shows additional receiver characteristics for this embodiment. Of note, the range at reflectivity of 80% (metal) is over 600 m. Furthermore, the max range envelope is between around 150 m and around 600 m depending on real life target reflectivities and topography/shape.

Figure 14A:
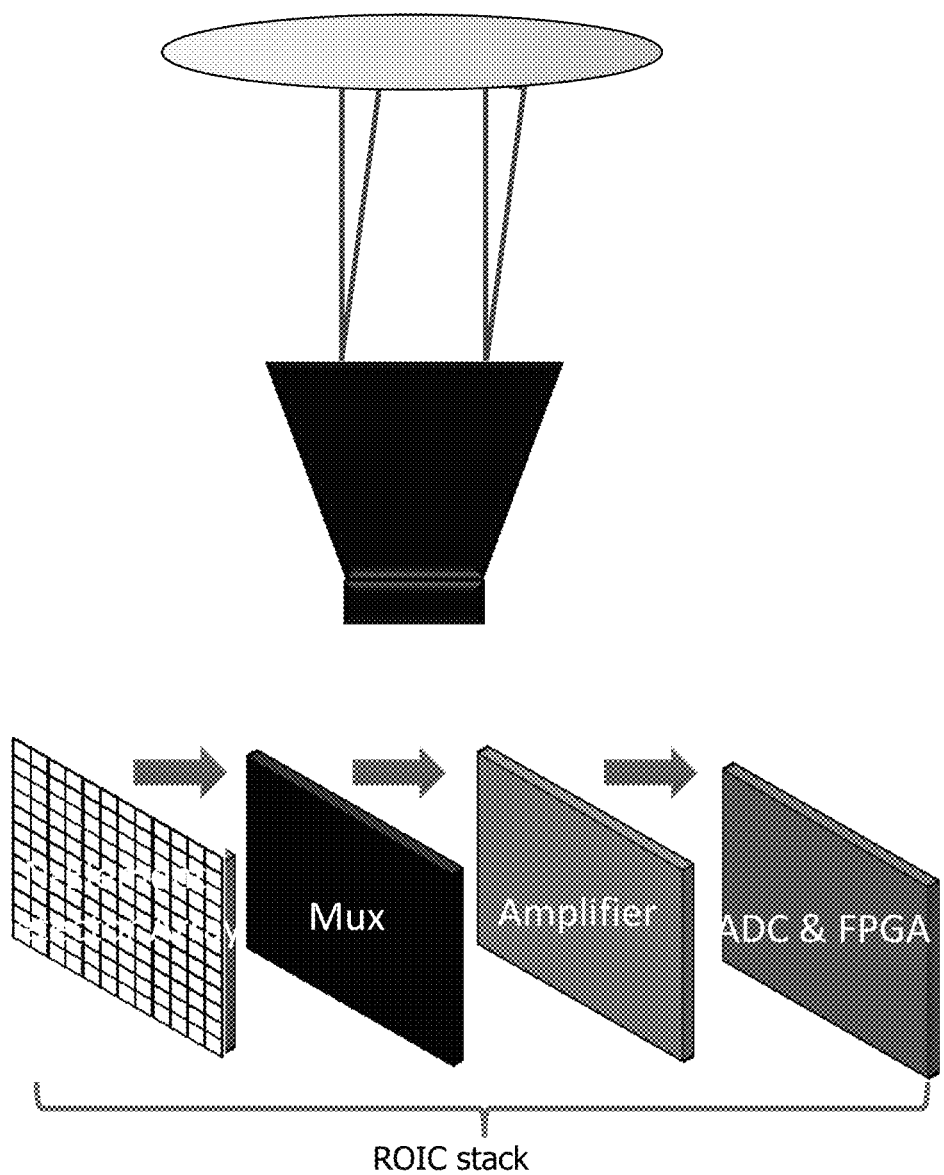
FIG. 14A depicts another example ladar receiver embodiment.
Figure 14B:
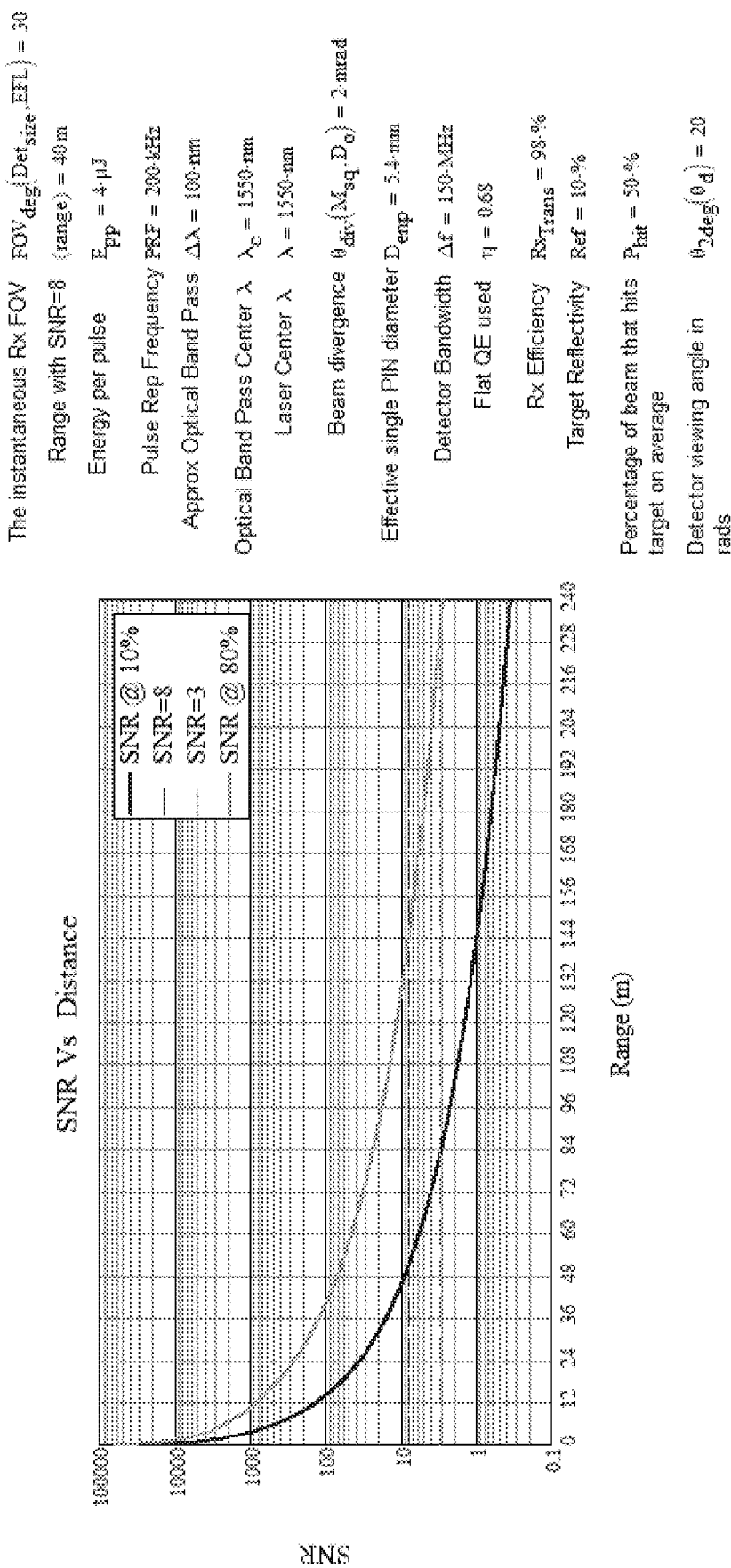
FIG. 14B depicts a plot of SNR versus range for daytime use of the FIG. 14A ladar receiver embodiment as well as additional receiver characteristics.

FIG. 14A depicts an example ladar receiver embodiment where detection optics such as that shown by FIG. 3B are employed and where the readout circuitry of FIG. 7A is employed. In this example, the ladar receiver is designed with an approximately 50×50 degree FOV, and an approximate 40 m range (@SNR=8, 10% reflectivity). As with the embodiment of FIG. 13A, the receiver employs a low number N-element detector array such as a silicon or InGaAs PIN/APD array. When using an InGaAs PIN array, the receiver of FIG. 14A may exhibit a 2 cm input aperture, employ an afocal non-imaging lens, and it may work in conjunction with an approximately 0.2-5.0 nanosecond laser pulse of around 4 microJoules per pulse. FIG. 14B depicts a plot of SNR versus range for daytime use of the FIG. 14A ladar receiver embodiment. FIG. 14B also shows additional receiver characteristics for this embodiment. Of note, the range at reflectivity of 80% (metal) is around 180 m. Furthermore, the max range envelope is between around 40 m and around 180 m depending on real life target reflectivities and topography/shape.

It is also possible to dramatically improve the detection range, the SNR and therefore detection probability, or both, by exploiting motion of either a ladar system-equipped vehicle or the motion of the objects it is tracking, or both. This can be especially useful for mapping a road surface due to a road surface's low reflectivity (~20%) and the pulse spreading and associated SNR loss.

Figure 15:
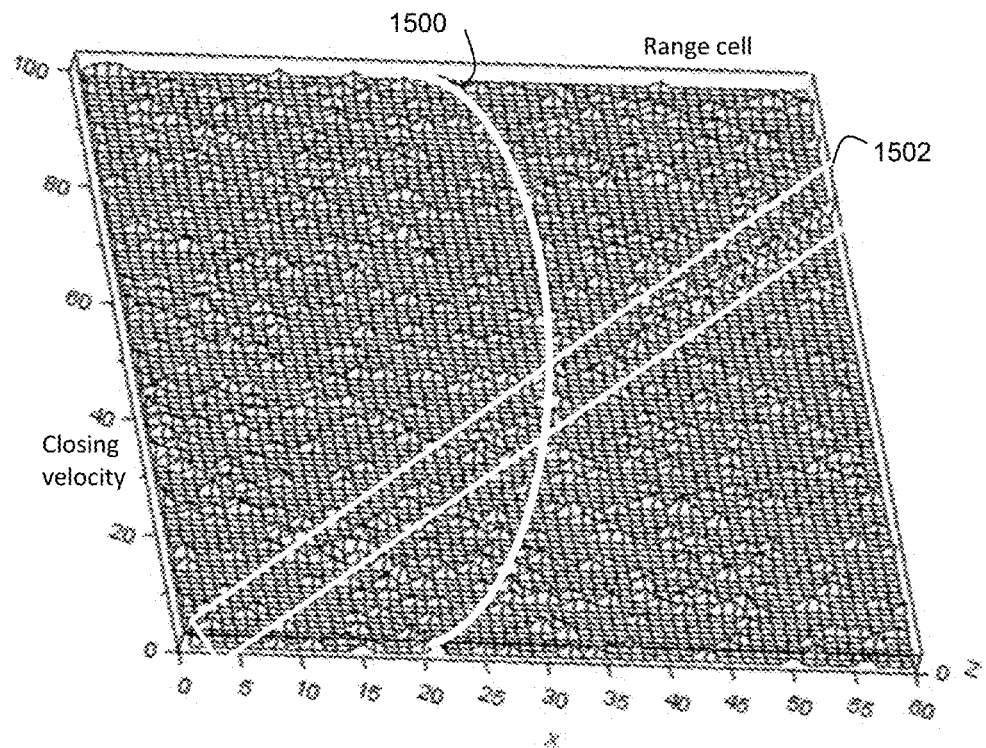
FIG. 15 depicts an example of motion-enhanced detector array exploitation.
Figure 16:
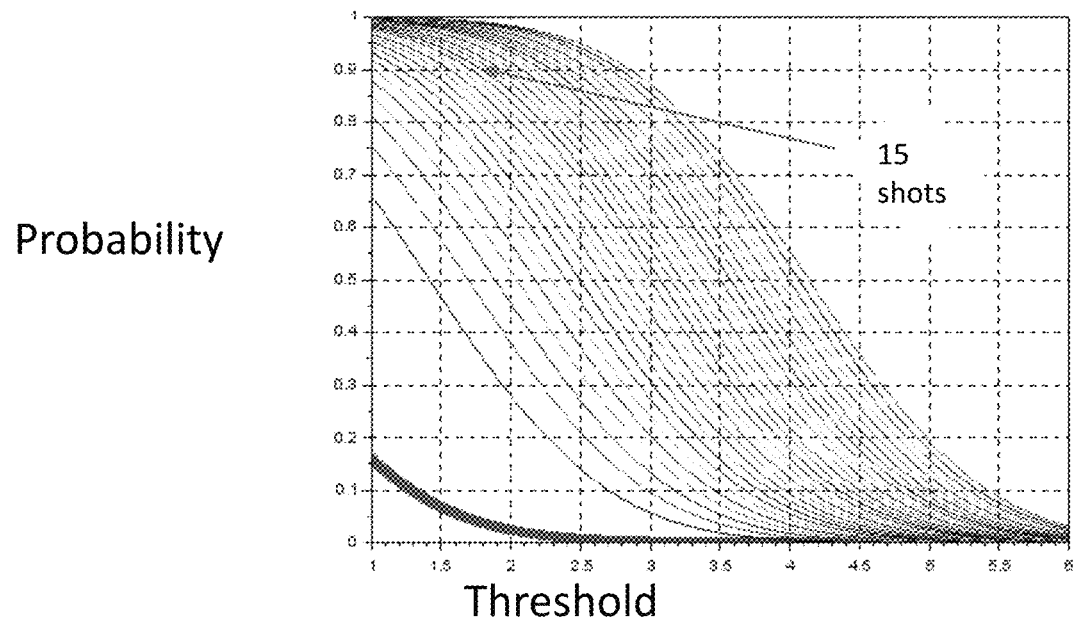
FIG. 16 depicts plots showing motion-enhanced detector array tracking performance.

The stochastic modulation of the two way (known) beam pattern embeds position information on the point cloud(s) obtained. We can extract from this embedding improved parameter estimates. This is essentially the dual of ISAR (inverse synthetic aperture radar) in radar remote sensing. This is shown in FIG. 15, where we show the detector output for a given azimuth and elevation pixel, with each row being the range returns from a single shot. As we aggregate shots we obtain integration gain. In FIG. 15 the solid white curve 1502 shows how a specified, fixed, ground reference point varies vertically due to vehicle motion. Note that the motion can lead to a non-linear contour. This is due to the fact that, even for fixed velocity, the ground plane projection does not, at near range, present a planar projection. In other words, the Jacobian of the ground plane projection is parametrically variant. The relative motion exploitation that we propose is to integrate the detector array outputs, either binary or intensity, along these contours to recreate the ground plane map. Such integration is necessitated in practice by the fact that the pulse spreads and thus each shot will present weak returns. Further: the asphalt tends to have rather low reflectivity, on the order of 20%, further complicating range information extraction. The white rectangular region 1502 show the migration in shots for a vehicle presenting relative motion with respect to the laser source vehicle. To simplify the plot, we show the case where differential inter-velocity [closing speed] is constant. The width of the rectangle 1502 presents the uncertainty in this differential. The scale shows this width is much larger than the width for ground mapping described above. This is because we must estimate the differential speed using ladar, while the own-car has GPS, accelerometers, and other instrumentation to enhance metrology. Close inspection will show that inside the white tilted rectangle 1502 there are more detections. This example is for an SNR of 2, showing that, even at low SNR, an integration along track [binary] can provide adequate performance. The receiver operating curve can be readily computed and is shown in FIG. 16. Shown is the detection probability, 1600 (thin lines upper right) as well as the false alarm curve, bottom left, 1602. We move for thin lines from one shot to 30 shots. The horizontal axis is the threshold at the post integration level, forming lines in the kinematic space as per FIG. 15. At a threshold of 1.5 observe that we get 95% 6% Pd Pfa at 15 shots, which for a closing speed of 50 m/s is 25 m target vehicle ingress, or ½ second.

While the invention has been described above in relation to its example embodiments, various modifications may be made thereto that still fall within the invention's scope. Such modifications to the invention will be recognizable upon review of the teachings herein.

What is claimed is:

1. A ladar system comprising:
   a ladar transmitter that includes a beam scanner, wherein the beam scanner selectively targets a plurality of range points within a frame, and wherein the ladar transmitter transmits ladar pulses toward the selectively targeted range points in accordance with a shot list; and a ladar receiver that includes a photodetector array and a circuit;

wherein the photodetector array comprises a plurality of light sensors, wherein each light sensor (1) senses light that is indicative of a plurality of ladar pulse returns from a plurality of the range points and (2) generates a signal indicative of the sensed light;

wherein the circuit selectively defines a plurality of subsets of the light sensors for read out at a given time based on the shot list to produce a signal representative of the sensed light signals from the light sensors included within the defined subsets, the produced signal for use in computing range information with respect to the targeted range points; and wherein the circuit includes feedback circuitry that amplifies outputs from the light sensors in a controlled feedback loop.

2. The system of claim 1 wherein the beam scanner selectively targets the range points by dynamically scanning a mirror according to the shot list.

3. The system of claim 2 wherein the beam scanner comprises a first mirror and a second mirror, wherein the first mirror is scannable to a plurality of first mirror scan positions, wherein the second mirror is scannable to a plurality of second mirror scan positions, wherein the first and second mirror scan positions in combination define where the ladar transmitter is targeted, and wherein the beam scanner employs compressive sensing to selectively target a subset of range points in the frame based on a range point down selection algorithm that identifies a subset of range points in the frame for targeting with ladar pulses.

4. The system of claim 2 wherein the beam scanner comprises a first mirror and a second mirror, wherein the first mirror is scannable to a plurality of first mirror scan positions based on a first control signal, wherein the second mirror is scannable to a plurality of second mirror scan positions based on a second control signal, wherein the first control signal scans the first mirror in a resonant mode, wherein the second control signal scans the second mirror in a point-to-point mode that varies as a function of the shot list, and wherein the first and second mirror scan positions in combination define where the ladar transmitter is targeted.

5. The system of claim 1 wherein the circuit includes a multiplexer that controls which light sensors are included in the defined subsets based on a control signal, wherein the control signal varies based on the shot list.

6. The system of claim 5 wherein the feedback circuitry includes amplifiers that are operatively between the photodetector array and the multiplexer.

7. The system of claim 6 wherein the photodetector array is resident on a substrate, and wherein the amplifiers are embedded in the substrate.

8. The system of claim 5 wherein the feedback circuitry serves as a matching network in resonance with a received ladar pulse return.

9. The system of claim 8 wherein the matching network is present on all input lines to the multiplexer.

10. The system of claim 1 wherein the light sensors correspond to pixels, and wherein the circuit selectively defines the subsets based on a mapping relationship between the pixels and range point locations that are targeted for ladar pulse shots by the shot list.

11. The system of claim 1 wherein the feedback circuitry serves as a matching network in resonance with a received ladar pulse return.

12. The system of claim 1 wherein the feedback circuitry is reset at each ladar pulse shot.

13. The system of claim 1 wherein the light sensors of the photodetector array correspond to a plurality of pixels, and wherein the defined subsets of light sensors change over time with respect to how many pixels are included in the defined subsets.

14. The system of claim 1 wherein the light sensors of the photodetector array correspond to a plurality of pixels, and wherein the circuit selectively controls which pixels are eligible for inclusion in the defined subsets based on feedback with respect to prior frames.

15. The system of claim 1 wherein the ladar transmitter transmits a plurality ladar pulses that exhibit a Gaussian pulse shape.

16. A ladar system comprising:

a ladar transmitter that includes a beam scanner, wherein the beam scanner selectively targets a plurality of range points within a frame, and wherein the ladar transmitter transmits ladar pulses toward the selectively targeted range points in accordance with a shot list; and a ladar receiver that includes a photodetector array, a multiplexer, and a feedback circuit;

wherein the photodetector array comprises a plurality of light sensors, wherein each light sensor (1) senses light that is indicative of a plurality of ladar pulse returns from a plurality of the range points and (2) generates a signal indicative of the sensed light;

wherein the multiplexer selectively defines a plurality of subsets of the light sensors for read out at a given time in response to a control signal that varies based on the shot list to produce a signal representative of the sensed light signals from the light sensors included within the defined subsets, the produced signal for use in computing range information with respect to the targeted range points;

wherein the feedback circuit amplifies outputs from the light sensors in a controlled feedback loop; and wherein the multiplexer receives the amplified outputs from the light sensors.

17. A ladar system comprising:

a ladar transmitter that selectively targets a plurality of range points within a frame in accordance with a shot list; and a ladar receiver that includes a photodetector array and a circuit;

wherein the photodetector array comprises a plurality of light sensors, wherein each light sensor (1) corresponds to a pixel, (2) senses light that is indicative of a plurality of ladar pulse returns from a plurality of the range points, and (3) generates a signal indicative of the sensed light;

wherein the circuit selectively defines a plurality of subsets of the light sensors for read out at a given time based on the shot list to produce a signal representative of the sensed light signals from the light sensors included within the defined subsets, the produced signal for use in computing range information with respect to the targeted range points; and wherein the circuit selectively controls which pixels are eligible for inclusion in the defined subsets based on feedback with respect to prior frames.

18. The system of claim 17 wherein the ladar transmitter includes a beam scanner that selectively targets the range points by dynamically scanning a mirror according to the shot list.

19. The system of claim 18 wherein the beam scanner comprises a first mirror and a second mirror, wherein the first mirror is scannable to a plurality of first mirror scan positions, wherein the second mirror is scannable to a plurality of second mirror scan positions, wherein the first and second mirror scan positions in combination define where the ladar transmitter is targeted, and wherein the beam scanner employs compressive sensing to selectively target a subset of range points in the frame based on a range point down selection algorithm that identifies a subset of range points in the frame for targeting with ladar pulses.

20. The system of claim 18 wherein the beam scanner comprises a first mirror and a second mirror, wherein the first mirror is scannable to a plurality of first mirror scan positions based on a first control signal, wherein the second mirror is scannable to a plurality of second mirror scan positions based on a second control signal, wherein the first control signal scans the first mirror in a resonant mode, wherein the second control signal scans the second mirror in a point-to-point mode that varies as a function of the shot list, and wherein the first and second mirror scan positions in combination define where the ladar transmitter is targeted.

21. The system of claim 17 wherein the circuit generates an adaptive fault tolerance mask that adjusts which of the pixels are eligible for inclusion in the defined subsets based on feedback from prior frames that indicates whether any of the pixels are malfunctioning.

22. The system of claim 17 wherein the circuit generates an adaptive mask that controls dynamic range for the produced signal by adjusting how many pixels are to be included in the defined subsets based on feedback from prior frames.

23. The system of claim 17 wherein the circuit generates an adaptive mask that adjusts which of the pixels are eligible for inclusion in the defined subsets based on feedback from prior frames that indicates a presence of interfering light that would impact one or more of the pixels.

24. The system of claim 17 wherein the circuit generates an adaptive mask that adjusts which of the pixels are eligible for inclusion in the defined subsets based on feedback from prior frames that indicates a presence of a scattering object that would impact one or more of the pixels.

25. The system of claim 17 wherein the circuit adjusts timing for ladar pulse shots on the shot list based on feedback from prior frames to reduce interference on the pixels of the defined sub sets.

26. The system of claim 17 wherein the circuit adjusts shot energy for ladar pulse shots on the shot list based on feedback from prior frames.

27. The system of claim 17 wherein the circuit adds or removes ladar pulse shots to or from the shot list based on feedback from prior frames.

28. The system of claim 17 wherein the circuit generates an adaptive mask that removes a center pixel from the defined subsets to reduce saturation risk based on feedback from prior frames.

29. The system of claim 17 wherein the feedback from prior frames comprises data derived from prior ladar pulse returns.

30. The system of claim 17 wherein the prior frames comprise video frames.

* * * * *